US010735573B2

(12) United States Patent
Endo et al.

(10) Patent No.: US 10,735,573 B2
(45) Date of Patent: Aug. 4, 2020

(54) CONTACT MANAGEMENT SYSTEM AND CONTACT MANAGEMENT METHOD

(71) Applicant: FUJITSU LIMITED, Kawasaki-shi, Kanagawa (JP)

(72) Inventors: Takafumi Endo, Kawasaki (JP); Yasunori Suzumura, Yokohama (JP); Hidetada Anan, Yokohama (JP); Yasuhiro Yamazono, Ageo (JP); Takeshi Gomi, Kawasaki (JP); Hiroshi Iyobe, Yokohama (JP); Kengo Kimura, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 784 days.

(21) Appl. No.: 15/162,958

(22) Filed: May 24, 2016

(65) Prior Publication Data
US 2016/0366258 A1 Dec. 15, 2016

(30) Foreign Application Priority Data

Jun. 9, 2015 (JP) .................................. 2015-116433

(51) Int. Cl.
*G06F 21/62* (2013.01)
*G06F 16/23* (2019.01)
(Continued)

(52) U.S. Cl.
CPC ........ *H04M 1/27457* (2020.01); *G06F 16/23* (2019.01); *G06F 21/6245* (2013.01);
(Continued)

(58) Field of Classification Search
CPC ........ G06F 16/23; G06F 16/20; G06F 16/217; G06F 16/2358; G06F 16/24575; G06F 16/25; H04L 61/1594
(Continued)

(56) References Cited

U.S. PATENT DOCUMENTS 8,332,440 B2 * 12/2012 Parker .................... G06Q 30/01
707/803
8,463,831 B2 * 6/2013 Harris .................... H04L 67/10
707/899
(Continued)

FOREIGN PATENT DOCUMENTS

| JP | 2002-232554 | 8/2002 |
|---|---|---|
| JP | 2009-245145 | 10/2009 |
| JP | 2014-98968 | 5/2014 |

*Primary Examiner* — Dangelino N Gortayo
(74) *Attorney, Agent, or Firm* — Staas & Halsey LLP

(57) ABSTRACT

A contact management system includes a first communication terminal and a managing device. The first communication terminal stores first contacts and has a first application program installed therein. The managing device includes a storage device and a first processor. The storage device stores application information related to respective application programs installed in any of communication terminals included in a first terminal group. The first processor receives, from the first communication terminal, a first inquiry about first contact information to be provided to the first application program. The first processor acquires first application information related to the first application and second application information related to second application programs installed in respective second communication terminals included in the first terminal group. The second communication terminals correspond to the respective first contacts. The first processor extracts second contacts from the first contacts and transmits the second contacts to the first communication terminal.

19 Claims, 25 Drawing Sheets

(51) Int. Cl.
*G06F 16/2457* (2019.01)
*G06F 16/20* (2019.01)
*G06F 16/25* (2019.01)
*G06F 16/21* (2019.01)
*H04M 1/27457* (2020.01)
*H04L 29/12* (2006.01)
*H04M 1/2757* (2020.01)

(52) U.S. Cl.
CPC ............ *G06F 16/20* (2019.01); *G06F 16/217* (2019.01); *G06F 16/24575* (2019.01); *G06F 16/25* (2019.01); *H04L 61/1594* (2013.01); *H04M 1/2757* (2020.01)

(58) Field of Classification Search
USPC ................ 707/769, 781, 803, 722, 748, 752
See application file for complete search history.

(56) References Cited

U.S. PATENT DOCUMENTS

| | | | | |
|---|---|---|---|---|
| 8,755,772 B1* | 6/2014 | Natsis | ............. | H04M 1/274516 455/412.1 |
| 8,775,404 B1* | 7/2014 | Peden | ................... | G06F 16/245 707/709 |
| 8,850,406 B1* | 9/2014 | Morrill | ..................... | G06F 8/61 717/124 |
| 8,856,136 B2* | 10/2014 | Yamakawa | ......... | G06F 21/6245 707/741 |
| 8,949,278 B2* | 2/2015 | Ulm | ..................... | G06Q 10/107 707/802 |
| 10,070,308 B2* | 9/2018 | Carter | ................... | H04W 12/02 |
| 2003/0142804 A1 | 7/2003 | Yamada et al. | | |
| 2005/0289180 A1* | 12/2005 | Pabla | ..................... | G06Q 10/10 |
| 2009/0247215 A1 | 10/2009 | Katsumata | | |
| 2011/0131504 A1* | 6/2011 | Shustef | ................ | G06F 16/958 715/745 |
| 2011/0231407 A1* | 9/2011 | Gupta | ................... | G06Q 10/10 707/748 |
| 2011/0238760 A1* | 9/2011 | Kuruganti | ............ | G06F 16/217 709/206 |
| 2012/0087367 A1* | 4/2012 | Anikin | .................... | H04W 4/21 370/352 |
| 2013/0067404 A1* | 3/2013 | Morrow | ................ | G06F 3/0482 715/810 |
| 2015/0186406 A1* | 7/2015 | Nadimi | ................ | G06Q 50/01 707/610 |
| 2016/0285885 A1* | 9/2016 | Wouhaybi | ............. | G06Q 50/01 |

* cited by examiner

| NAME | PHONE NUMBER | MAIL ADDRESS |
|---|---|---|
| USER A | 71XXXX | X@fffff |
| USER B | 72YYYY | Y@fffff |
| USER C | 73ZZZZ | Z@fffff |
| USER D | 74AAAA | A@fffff |

| PHONE NUMBER | LATEST COLLECTION DATE | APPLICATION INFORMATION LIST | | | |
|---|---|---|---|---|---|
| 71XXXX | FEBRUARY 22, 2015 | APA | APB | APC | APD |
| 72YYYY | MAY 7, 2014 | APA | APJ | APW | |
| 73ZZZZ | DECEMBER 12, 2015 | APB | | | |
| 74AAAA | OCTOBER 21, 2014 | API | APJ | APX | APK |

| NAME | READING | PHONE NUMBER | MAIL ADDRESS | COMPANY NAME | ADDRESS | ZIP CODE |
|---|---|---|---|---|---|---|
| USER A | YUZA A | 71XXXX | X@fffff | FFF | KANAGAWA PREFECTURE | 190-0013 |
| USER B | YUZA B | 72YYYY | Y@fffff | FNST | TOKYO PREFECTURE | 191-0014 |
| USER C | YUZA C | 73ZZZZ | Z@fffff | PFU | SAITAMA PREFECTURE | 192-0015 |
| USER D | YUZA D | 74AAAA | A@fffff | FST | CHIBA PREFECTURE | 193-0016 |

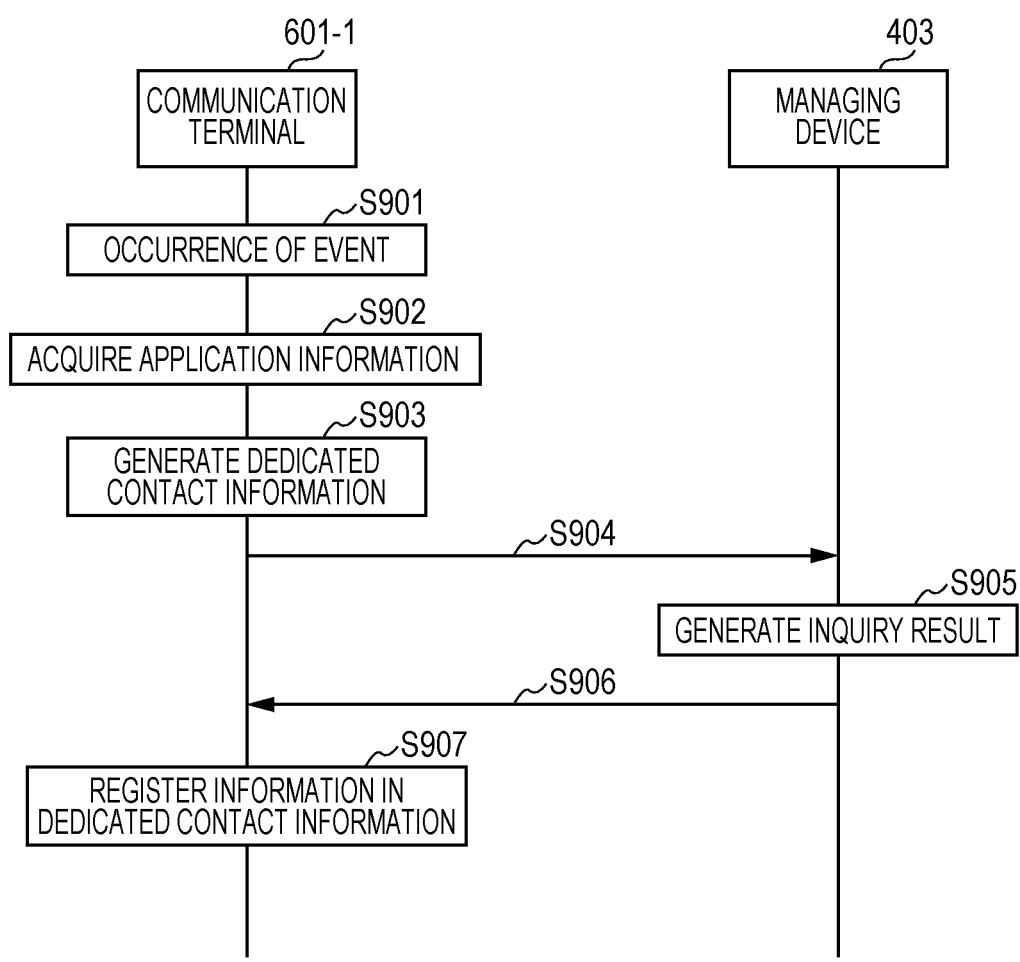

| OWNER'S NUMBER | 60000006 |
|---|---|
| APPLICATION INFORMATION | APA |
| PHONE NUMBER LIST | 71XXXX<br>72YYYY<br>73ZZZZ<br>74AAAA |

| PHONE NUMBER LIST | 71XXXX<br>72YYYY |
|---|---|

622

| NAME | READING | PHONE NUMBER | MAIL ADDRESS | COMPANY NAME | ADDRESS | ZIP CODE |
|---|---|---|---|---|---|---|
| USER A | YUZA A | 71XXXX | X@fffff | FFF | KANAGAWA PREFECTURE | 190-0013 |
| USER B | YUZA B | 72YYYY | Y@fffff | FNST | TOKYO PREFECTURE | 191-0014 |

| PHONE NUMBER | LATEST COLLECTION DATE | APPLICATION INFORMATION LIST | | | |
|---|---|---|---|---|---|
| GAxxxx | FEBRUARY 22, 2015 | APA | APB | APC | APD |
| GBxxxx | MAY 7, 2014 | APA | APJ | APW | |
| GCxxxx | DECEMBER 12, 2015 | APB | | | |
| GDxxxx | OCTOBER 21, 2014 | API | APJ | APX | APK |

FIG. 24

60000006, 71XXXX, 72YYYY, 73ZZZZ, 74AAAA

↓

AHAABCDE, GAxxxx, GBxxxx, GCxxxx, GDxxxx

↓

APA, AHAABCDE, GAxxxx, GBxxxx, GCxxxx, GDxxxx

↓

Enc[APA, AHAABCDE, GAxxxx, GBxxxx, GCxxxx, GDxxxx]

| COLLECTION DATE | APPLICATION INFORMATION LIST |
|---|---|
| JANUARY 1, 2015 | APA, APB, APC |

APB IS DELETED

| COLLECTION DATE | APPLICATION INFORMATION LIST |
|---|---|
| FEBRUARY 1, 2015 | APA, APC, APD, APE |

| OWNER'S NUMBER | 60000006 |
|---|---|
| APPLICATION INFORMATION | APA |
| PHONE NUMBER LIST | 72XXXX |

461

| PHONE NUMBER | LATEST COLLECTION DATE | APPLICATION INFORMATION LIST |
|---|---|---|
| 60000006 | 20:02, MARCH 1, 2015 | APA |

| OWNER'S NUMBER | 72XXXX |
|---|---|
| APPLICATION INFORMATION | APA |
| PHONE NUMBER LIST | 60000006 |

FIG. 30

| 60000006 |
|---|

| PHONE NUMBER | LATEST COLLECTION DATE | APPLICATION INFORMATION LIST |
|---|---|---|
| 72XXXX | 20:11, MARCH 2, 2015 | APA |
| 60000006 | 20:02, MARCH 1, 2015 | APA |

FIG. 32

| 72XXXX |
|---|

461

| PHONE NUMBER | LATEST COLLECTION DATE | APPLICATION INFORMATION LIST |
|---|---|---|
| 72XXXX | 20:11, MARCH 2, 2015 | APA |
| 60000006 | 20:02, MARCH 3, 2015 | APA |

| PHONE NUMBER | LATEST COLLECTION DATE |
|---|---|
| 71XXXX | JANUARY 15, 2015 |
| 72YYYY | DECEMBER 30, 2014 |
| 73ZZZZ | APRIL 18, 2014 |
| 74AAAA | OCTOBER 22, 2013 |

⇨

| PHONE NUMBER | LATEST COLLECTION DATE |
|---|---|
| 71XXXX | JANUARY 15, 2015 |
| 72YYYY | DECEMBER 30, 2014 |

| USER ID | USER INFORMATION | APPLICATION INFORMATION LIST | | |
|---|---|---|---|---|
| 1010101 | 71XXXX | APA | APB | APC |
| 1111111 | 72YYYY | APA | APJ | APW |
| 2121212 | 73ZZZZ | APB | | |
| 2222222 | 74AAAA | API | APJ | APX |

FIG. 38

| PHONE NUMBER LIST | 71XXXX<br>72YYYY<br>73ZZZZ<br>74AAAA |
|---|---|

CONTACT MANAGEMENT SYSTEM AND CONTACT MANAGEMENT METHOD

CROSS-REFERENCE TO RELATED APPLICATION

This application is based upon and claims the benefit of priority of the prior Japanese Patent Application No. 2015-116433, filed on Jun. 9, 2015, the entire contents of which are incorporated herein by reference.

FIELD

The embodiment discussed herein is related to a contact management system and a contact management method.

BACKGROUND

Contact information stored in communication terminals such as mobile phones includes personal information of owners owning the communication terminals and personal information of information providers. The information providers are persons who provide information such as phone numbers to the terminal owners.

FIG. 1 illustrates an example of the personal information of the information providers included in the contact information. Names indicate the names (identifiers: IDs) of the information providers, and phone numbers and mail addresses are contacts indicating the communication terminals owned by the information providers and are associated with the names of the information providers. For example, a phone number of a user A is "71XXXX", and a mail address of the user A is "X@ffff". The personal information of the information providers may include addresses, birthdays, and the like. The personal information of the terminal owners includes information similar to the personal information of the information providers.

In communication terminals that are smartphones, tablets, and the like and have appeared on the market in recent years, application programs allow to use application programming interfaces (APIs) for acquisition of contact information or the like to acquire contact information instead of directly referencing the contact information within the communication terminals. Hereinafter, application programs are merely referred to as applications in some cases. In addition, functions that are achieved by causing a computer or the like to execute application programs are referred to as applications in some cases.

Related techniques are disclosed in, for example, Japanese Laid-open Patent Publication No. 2014-98968, Japanese Laid-open Patent Publication No. 2009-245145, and Japanese Laid-open Patent Publication No. 2002-232554.

Traditional applications that have the right of access to contact information may use personal information of all information providers that is included in the contact information, and a technique that allows the information providers to control whether or not the personal information thereof is to be used is not known.

The aforementioned problem is not limited to mobile communication terminals such as mobile phones, smartphones, or tablets and occurs to other communication terminals such as personal computers.

SUMMARY

According to an aspect of the present invention, provided is a contact management system including a first communication terminal and a managing device. The first communication terminal is configured to store therein first contacts. The first communication terminal is configured to have a first application program installed therein. The managing device includes a storage device and a first processor. The storage device is configured to store therein application information related to respective application programs installed in any of communication terminals included in a first terminal group. The first processor is configured to receive, from the first communication terminal, a first inquiry about first contact information to be provided to the first application program. The first processor is configured to acquire first application information related to the first application program. The first processor is configured to acquire second application information related to second application programs installed in respective second communication terminals included in the first terminal group. The second communication terminals correspond to the respective first contacts. The first processor is configured to extract second contacts from the first contacts. The first processor is configured to transmit the second contacts to the first communication terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating first installation information;

FIG. 8 is a diagram illustrating master contact information;

FIG. 9 is a diagram illustrating an inquiry process;

FIG. 23 is a diagram illustrating installation information in a message digest format;

FIG. 24 is a diagram illustrating an encryption process;

FIG. 30 is a diagram illustrating the result of the second inquiry;

FIG. 31 is a diagram illustrating third installation information;

FIG. 32 is a diagram illustrating the result of the third inquiry;

FIG. 37 is a diagram illustrating fifth installation information;

FIG. 38 is a diagram illustrating a fourth inquiry; and

DESCRIPTION OF EMBODIMENT

Hereinafter, an embodiment is described with reference to the accompanying drawings.

Figures 1, 2:
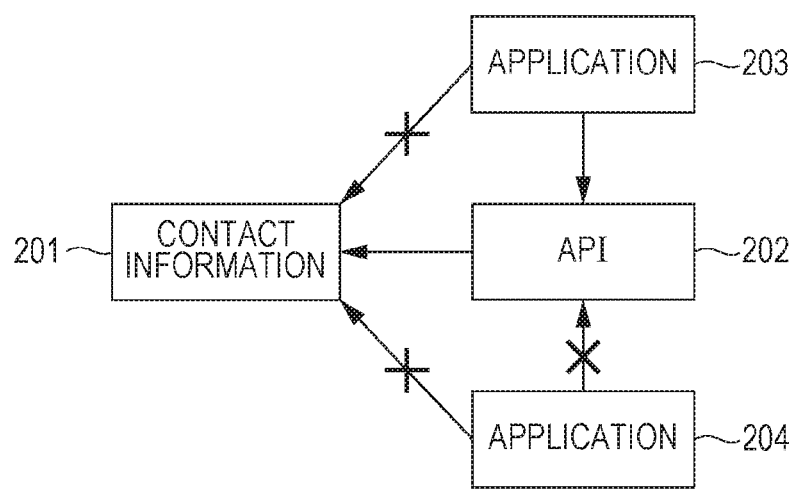
FIG. 1 is a diagram illustrating personal information included in contact information.
FIG. 2 is a diagram illustrating access to contact information.

FIG. 2 illustrates an example of access to contact information from an application installed in a traditional communication terminal. An application 203 that has the right of access to contact information 201 may acquire the contact information 201 through an API 202 for acquisition of contact information. The application 203, however, is prohibited from directly accessing the contact information 201. An application 204 does not have the right of access to the contact information 201 and is prohibited from accessing the contact information 201 and the API 202.

A person who gives the access right to the application is a terminal owner and is not an information provider. The application to which the access right has been given may use personal information of all information providers that is included in the communication terminal. It is, therefore, difficult for the information providers to inhibit personal information thereof from being referenced by the application installed in the communication terminal of the terminal owner.

Figure 3:
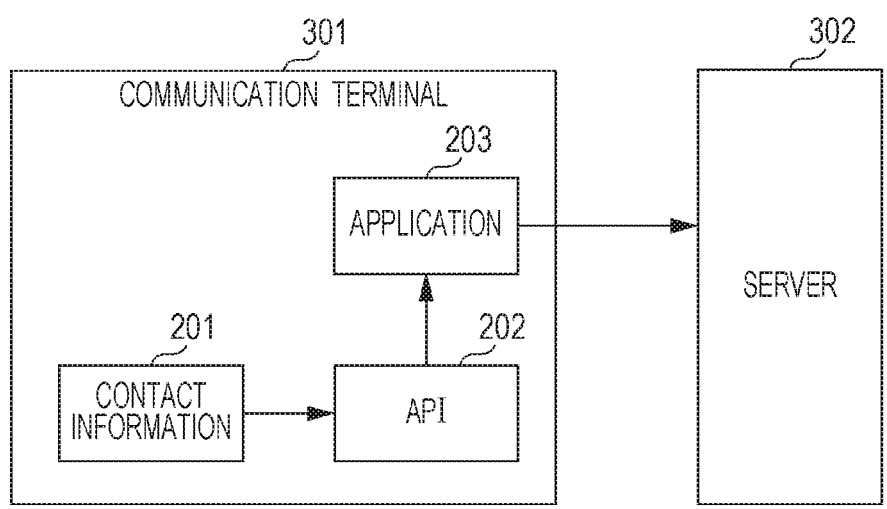
FIG. 3 is a diagram illustrating the use of personal information.

FIG. 3 illustrates an example of the use of personal information by the application. The application 203 installed in a communication terminal 301 of a terminal owner is, for example, a free call application and the right of access to the contact information 201 is given by the terminal owner to the application 203. In this case, the application 203 may transmit the contact information 201 acquired through the API 202 to a server 302 of an application provider that has provided the application 203. In this manner, personal information of information providers may be transmitted to the server 302.

The contact information stored in the communication terminal does not include, for each of applications that access the contact information, control information to be used to determine which of the multiple personal information items is permitted to be disclosed. Thus, the applications are able to transmit, from the communication terminal to an external, the personal information of all the information providers that is included in the contact information.

In order to permit only an application permitted by an information provider to use personal information of the information provider, it is desirable to install, in a communication terminal, not only a mechanism of controlling access on the basis of control information but also a mechanism of acquiring the control information and setting the acquired control information in the communication terminal.

Figure 4:
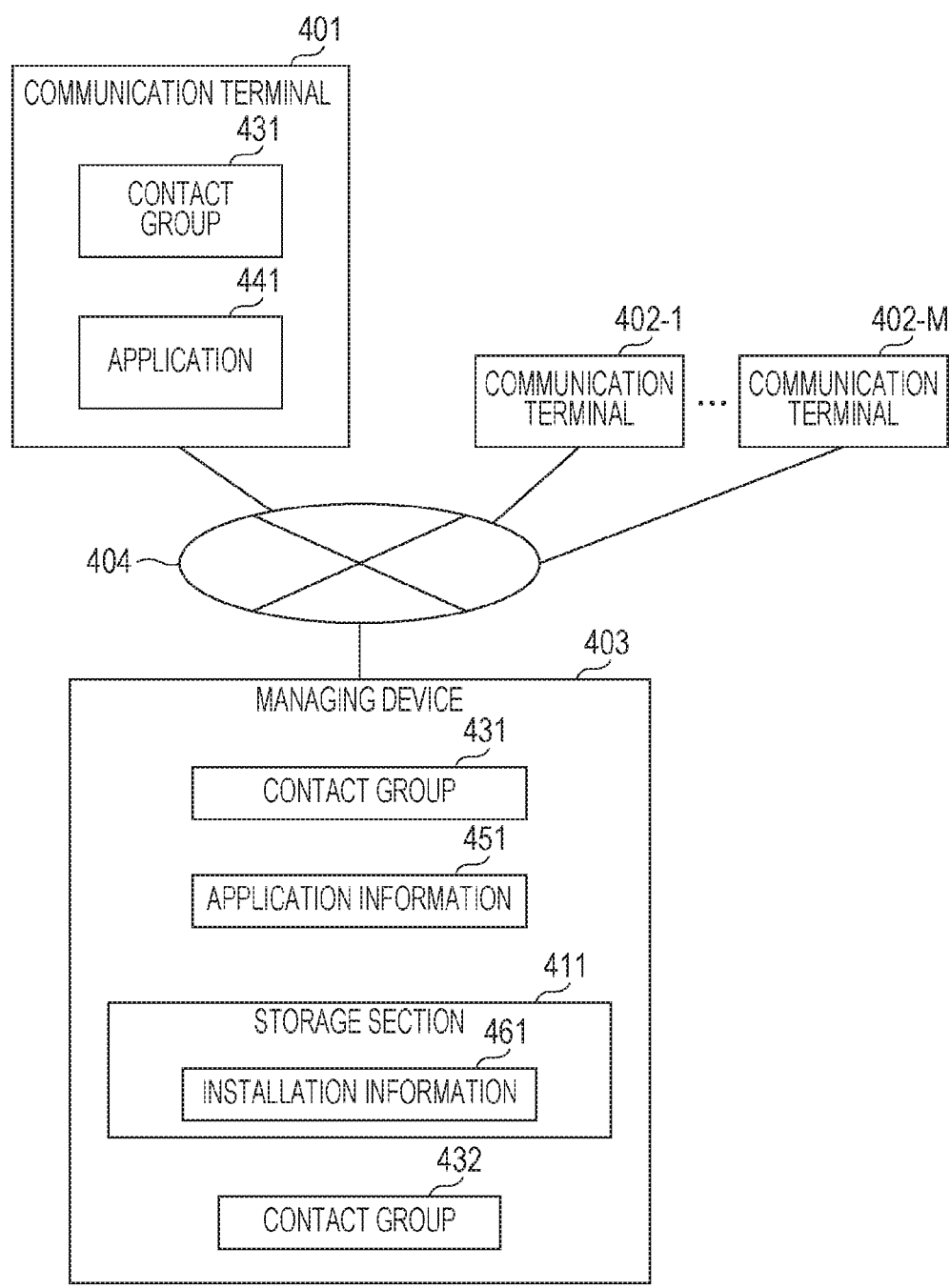
FIG. 4 is a diagram illustrating a configuration of a contact management system.

FIG. 4 illustrates an example of a configuration of a contact management system according to the embodiment. The contact management system illustrated in FIG. 4 includes a communication terminal 401, communication terminals 402-1 to 402-M (M is an integer of 2 or larger), and a managing device 403. The managing device 403 includes a storage section 411 and may communicate with the communication terminal 401 and the communication terminals 402-1 to 402-M through a communication network 404.

The communication terminal 401 stores therein a contact group 431. The communication terminal 401 has an application 441 installed therein. The storage section 411 of the managing device 403 stores therein installation information 461 including application information related to applications installed in the communication terminals 402-1 to 402-M associated with multiple contacts included in the contact group 431. The managing device 403 may store therein application information 451 related to the application 441 or may receive the application information 451 from the communication terminal 401.

Figure 5:
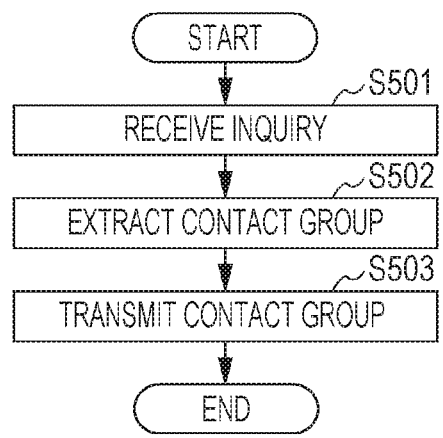
FIG. 5 is a flowchart of a contact management process.

FIG. 5 is a flowchart of an example of a contact management process to be executed by the managing device 403 illustrated in FIG. 4. First, the managing device 403 receives, from the communication terminal 401, an inquiry about contact information to be provided to the application 441 (in S501).

The managing device 403 references the installation information 461 and the application information 451 and extracts a contact group 432 from the contact group 431 (in S502). Then, the managing device 403 transmits the extracted contact group 432 to the communication terminal 401 (in S503).

According to the contact management system illustrated in FIG. 4, access to contact information stored in the communication terminal 401 that is not to be controlled may be controlled.

Figure 6:
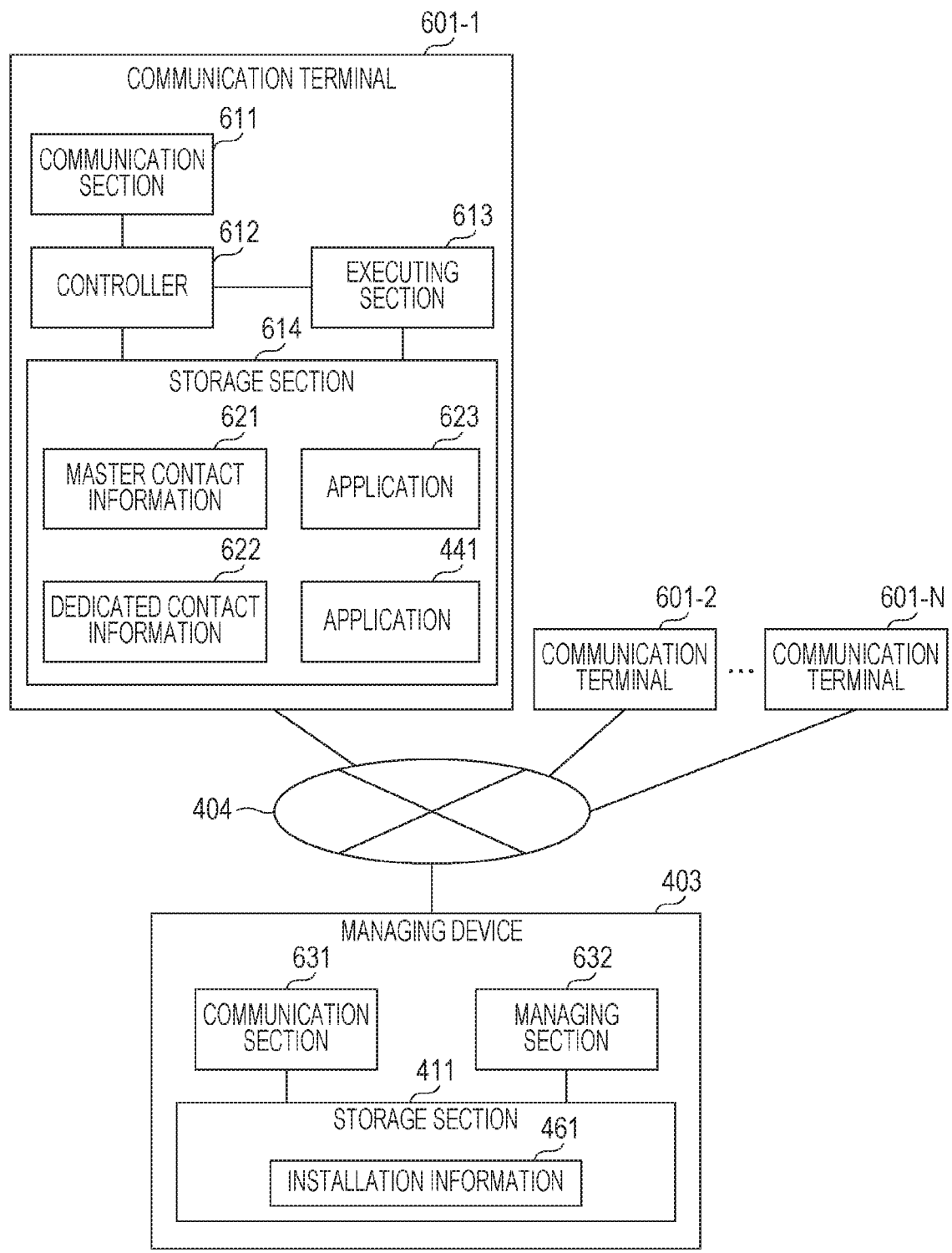
FIG. 6 is a diagram illustrating a specific example of the configuration of the contact management system.

FIG. 6 illustrates a specific example of the contact management system illustrated in FIG. 4. The contact management system illustrated in FIG. 6 includes communication terminals 601-1 to 601-N (N is an integer of 2 or larger) and the managing device 403.

Each of the communication terminals 601-$i$ ($i$ is an integer in a range of 1 to N) includes a communication section 611, a controller 612, an executing section 613, and a storage section 614. The storage section 614 stores therein master contact information 621, dedicated contact information 622, an application 623, and the application 441. Each of the communication terminals 401 and 402-1 to 402-M illustrated in FIG. 4 corresponds to any of the communication terminals 601-$i$.

The master contact information 621 includes multiple contacts registered in the communication terminal 601-i. The dedicated contact information 622 includes a part or all of the contacts included in the master contact information 621. The application 441 is to be subjected to access control. The application 441 does not have the right of access to the master contact information 621 and has the right of access to the dedicated contact information 622.

The application 623 is not to be subjected to the access control and has the right of access to the master contact information 621. For example, a standard application provided by a vendor of an operating system (OS) installed in the communication terminal 601-i may not be subjected to the access control.

The executing section 613 executes the application 623 and the application 441. The controller 612 reads information from the master contact information 621 or the dedicated contact information 622 in response to a request from the application 623 or the application 441 and transfers the read information to the application 623 or the application 441 that is a source of the request. The communication section 611 communicates with the managing device 403 in response to a request from the controller 612.

If other applications are executed on the communication terminal 601-i, the controller 612 may generate dedicated contact information 622 for each of the applications, cause the generated dedicated contact information 622 to be stored in the storage section 614, and edit the dedicated contact information 622. The function of the controller 612 may be achieved by the OS of the communication terminal 601-i or achieved by the API for acquisition of contact information.

The managing device 403 includes the storage section 411, a communication section 631, and a managing section 632. The storage section 411 stores therein the installation information 461. In the installation information 461, a contact that indicates each communication terminal 601-i is associated with application information related to applications installed in the communication terminal 601-i. The communication section 631 communicates with the communication terminal 601-i in response to a request from the managing section 632. The managing section 632 collects the application information from the communication terminal 601-i through the communication section 611 and updates the installation information 461.

The managing section 632 has the right to use user information collected from the communication terminals 601-i and adds new contacts that have not been registered in the installation information 461 to the installation information 461. If an application installed in a communication terminal 601-i is changed, the managing section 632 updates application information associated with a contact associated with the communication terminal 601-i in the installation information 461. If a communication terminal 601-i does not notifies the managing device 403 of application information for a long time period, the managing section 632 may delete a contact of the communication terminal 601-i from the installation information 461.

FIG. 7 illustrates an example of the installation information 461. The installation information 461 illustrated in FIG. 7 includes phone numbers, latest collection dates, and application information lists. The phone numbers are specific phone numbers (owner's numbers) written in the communication terminals and indicate the contacts of the communication terminals. The latest collection dates indicate dates when the application information is lastly collected from the communication terminals and are used to determine whether or not the phone numbers are being used.

The application information lists are lists of the application information related to the applications installed in the communication terminals. The application information is specific information identifying the applications. For example, the application information includes application names, version information of the applications, and the like. For example, the date when a phone number "71XXXX" is lastly collected is Feb. 22, 2015, and application information associated with the phone number "71XXXX" is APA, APB, APC, and APD.

In this case, the managing section 632 uses the phone numbers as main keys to edit the installation information 461, periodically updates the application information lists on a phone number basis, and deletes an application information list along with the deletion of a phone number.

For example, if the communication terminal 601-1 is owned by a terminal owner and the communication terminal 601-2 is owned by an information provider, the managing section 632 checks applications installed in the communication terminals 601-1 and 601-2. Then, if an application within the communication terminal 601-2 corresponds to the application 441 within the communication terminal 601-1, the managing section 632 determines that the information provider permits the application 441 to use personal information of the information provider.

FIG. 8 illustrates an example of the master contact information 621. The master contact information 621 illustrated in FIG. 8 includes names, readings, phone numbers, mail addresses, company names, addresses, and zip codes. The names indicate the names (IDs) of terminal owners who own the communication terminals 601-i, and the readings indicate how the names are read. The phone numbers and the mail addresses are the contacts indicating the communication terminals owned by the terminal owners. The company names, the addresses, and the zip codes are a part of personal information of the terminal owners. For example, a phone number of a user A is "71XXXX".

Personal information to be registered in the master contact information 621 may be acquired by using an information exchange application or may be input from input devices operated by the terminal owners.

Although the phone numbers registered in the installation information 461 illustrated in FIG. 7 match the phone numbers registered in the master contact information 621 illustrated in FIG. 8, the installation information 461 may include a larger number of phone numbers than the master contact information 621.

The controller 612 of the communication terminal 601-1 uses a contact included in the master contact information 621 to provide an inquiry to the managing device 403 through the communication section 611. Thus, the controller 612 may acquire, from the managing device 403, information of an application installed in another communication terminal 601-i indicated by the contact. In addition, the controller 612 may cause the inquiry to include application information and notify the managing device 403 of an application installed in the communication terminal 601-1.

FIG. 9 illustrates an example of a sequence of an inquiry process to be executed by the communication terminal 601-1. When an event to trigger the inquiry process occurs (in S901), the controller 612 acquires application information of the application 441 (in S902) and generates the dedicated contact information 622 (in S903). At this time, a contact is yet to be registered in the generated dedicated contact information 622. The trigger of the inquiry process may be any of the following cases.

(a) When the application 441 requests the controller 612 to provide contact information.

(b) When a certain time period elapses after the previous inquiry process.

Next, the controller 612 transmits, to the managing device 403, an inquiry including the phone number (owner's number) of the communication terminal 601-1, the application information of the application 441 and a phone number list included in the master contact information 621 (in S904).

Figures 10, 11, 12:
FIG. 10 is a diagram illustrating a first inquiry.
FIG. 11 is a diagram illustrating the result of the first inquiry.
FIG. 12 is a diagram illustrating dedicated contact information.

FIG. 10 illustrates an example of the inquiry generated from the master contact information 621 illustrated in FIG. 8. APA indicates the application information of the application 441, and the phone number list corresponds to the contact group 431.

The managing section 632 of the managing device 403 crosschecks the received application information and the received phone number list with the installation information 461 (in S905). At this time, the managing section 632 searches the installation information 461 for phone numbers associated with application information corresponding to the received application information and extracts detected phone numbers from the received phone number list. Then, the managing section 632 generates a result of the inquiry that includes a group of the extracted phone numbers.

FIG. 11 illustrates an example of the result of the inquiry illustrated in FIG. 10. Among the phone numbers included in the inquiry illustrated in FIG. 10, phone numbers associated with APA in the installation information 461 illustrated in FIG. 7 are "71XXXX" and "72YYYY". Thus, these two phone numbers are extracted as the inquiry result.

Next, the managing section 632 transmits the inquiry result to the communication terminal 601-1 (in S906). The controller 612 acquires, from the master contact information 621, information associated with the phone numbers included in the inquiry result and registers the acquired information in the dedicated contact information 622 (in S907).

FIG. 12 illustrates an example of the dedicated contact information 622 generated from the inquiry result illustrated in FIG. 11. The dedicated contact information 622 illustrated in FIG. 12 includes personal information of only users A and B associated with "71XXXX" and "72YYYY", respectively, among the terminal owners registered in the master contact information 621 illustrated in FIG. 8.

The application 441 does not have the right of access to the master contact information 621 and may use only the dedicated contact information 622. Personal information that is permitted to be used by the application 441 may be limited by the use of the dedicated contact information 622 instead of the master contact information 621.

If the communication terminal 601-1 provides a background function to the application 441, the application 441 is less likely to be suspended after the activation of the application 441. The inquiry process described with reference to FIG. 9 may be executed upon the activation of the application 441 and at certain time intervals between the activation of the application 441 and the suspension of the application 441. Thus, the latest installation information 461 may be reflected in the dedicated contact information 622, and a reduction in the quality of the dedicated contact information 622 may be inhibited.

Figure 13:
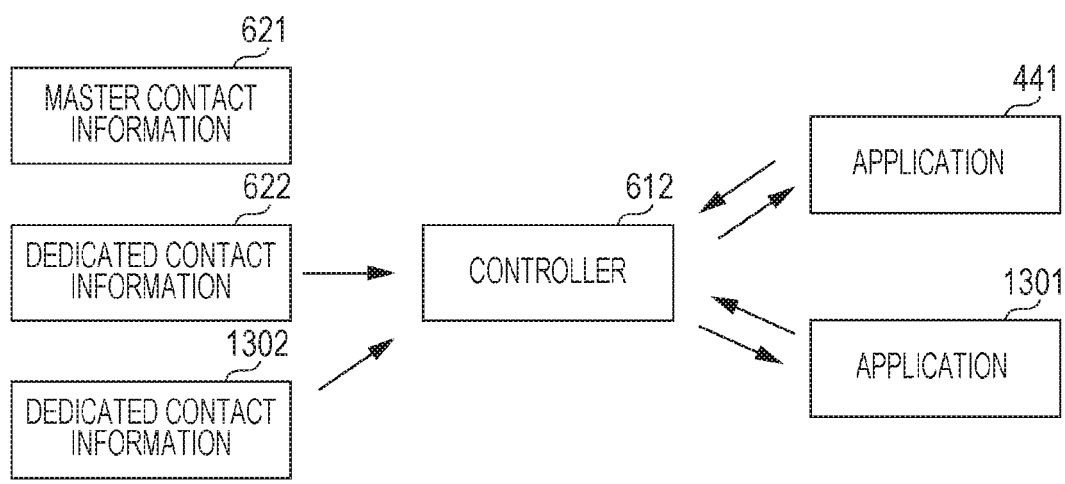
FIG. 13 is a diagram illustrating access to dedicated contact information.

FIG. 13 illustrates an example of access from applications to dedicated contact information. When the application 441 and an application 1301 are executed in the communication terminal 601-1, the applications acquire contact information through the controller 612. The dedicated contact information 622 is contact information for the application 441, while dedicated contact information 1302 is contact information for the application 1301.

The controller 612 identifies an application providing a request and transmits dedicated contact information for the application. When the controller 612 is requested by the application 441 to provide the contact information, the controller 612 reads the information from the dedicated contact information 622 and transmits the read information to the application 441. When the controller 612 is requested by the application 1301 to provide the contact information, the controller 612 reads the information from the dedicated contact information 1302 and transmits the read information to the application 1301.

Since dedicated contact information is provided for each of applications, personal information of an information provider that is stored in the communication terminal 601-1 is inhibited from leaking to an application that is not permitted by the information provider. In addition, personal information may be appropriately protected without a procedure for receiving the permission of the use of personal information from terminal owners of the communication terminals 601-*i* for each of the applications.

If the functions of the controller 612 are implemented by a method of replacing an API for acquisition of contact information, the OS and the applications are not upgraded. Thus, dedicated contact information may be provided for each of all existing applications.

If the controller 612 is requested by an application to provide the contact information, the controller 612 acquires an identification information item (for example, a process name) of the requesting application and confirms, on the basis of the identification information item, whether or not the dedicated contact information for the requesting application exists. If the dedicated contact information for the requesting application does not exist, such as in a case of the initial activation of the application immediately after the installation of the application, the controller 612 executes the inquiry process described with reference to FIG. 9 and generates the dedicated contact information.

Figure 14:
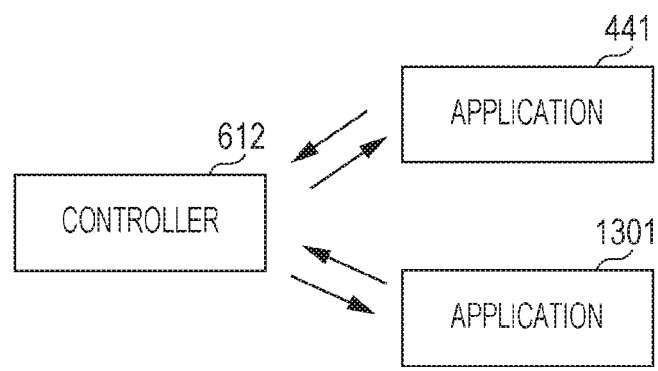
FIG. 14 is a diagram illustrating a method of acquiring application information.

FIG. 14 illustrates an example of a method of acquiring application information. The controller 612 acquires information of various types from each application installed in the communication terminal 601-1 and uses, as the application information, information selected from among the acquired information.

Figure 15:
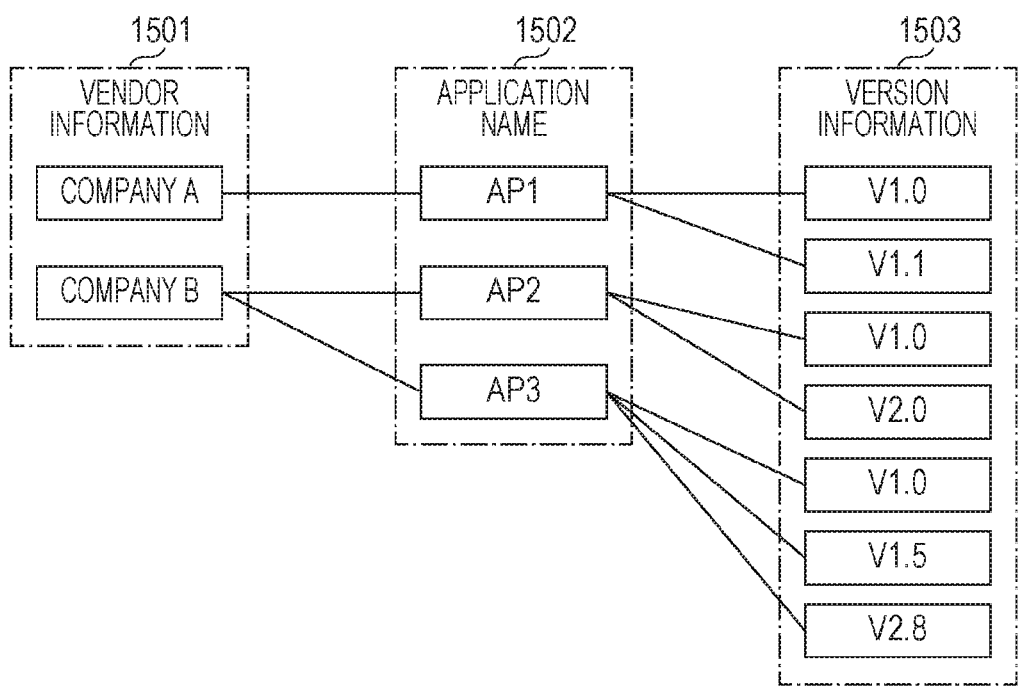
FIG. 15 is a diagram illustrating management information.

FIG. 15 illustrates an example of management information which is used by the managing section 632 of the managing device 403 to manage application information. The management information illustrated in FIG. 15 is stored in the storage section 411 in a tree structure, and includes vendor information 1501 of vendors providing applications, application names 1502, and version information 1503.

The vendor information 1501 indicates that the two vendors A and B exist. The application names 1502 indicate that the vendor A provides an application AP1 and that the vendor B provides applications AP2 and AP3. The version information 1503 indicates versions of the applications AP1, AP2, and AP3. As versions of the application AP1, V1.0 and V1.1 exist. As versions of the application AP2, V1.0 and V2.0 exist. As versions of the application AP3, V1.0, V1.5, and V2.8 exist.

The managing section 632 may determine whether or not personal information is permitted to be used, by comparing the applications on the basis of the management information on a vendor basis, an application basis, or a version basis.

Figure 16:
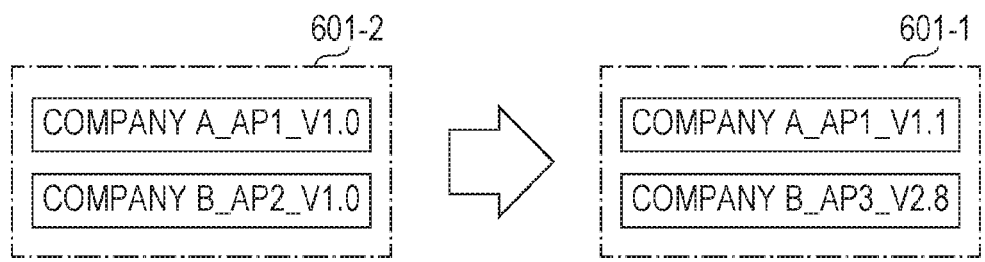
FIG. 16 is a diagram illustrating determination to be made on a vendor basis.

FIG. 16 illustrates an example of the determination to be made on a vendor basis. In the determination made on a vendor basis, if the vendor information of two applications matches, the managing section 632 determines that application information of the two applications matches each other. The application AP1 with the version V1.0 that is provided by the vendor A, and the application AP2 with the version V1.0 that is provided by the vendor B, are installed in the communication terminal 601-2 of the information provider. The application AP1 with the version V1.1 that is provided by the vendor A, and the application AP3 with the version V2.8 that is provided by the vendor B, are installed in the communication terminal 601-1.

If the information provider gives permissions on a vendor basis, the managing section 632 references the management information and checks the vendor information of the applications within the communication terminals. In FIG. 16, the applications provided by the vendors A and B are installed in the communication terminals 601-1 and 601-2. Thus, the managing section 632 determines that the applications AP1 and AP3 installed in the communication terminal 601-1 are permitted to use the personal information of the information provider.

If the application AP1 with the version V1.0 that is provided by the vendor A is not installed in the communication terminal 601-2, the communication terminal 601-2 does not include an application of which the vendor information matches the vendor information of the application AP1 within the communication terminal 601-1. Thus, the personal information of the information provider is prohibited from being used by the application AP1 installed in the communication terminal 601-1.

Figure 17:
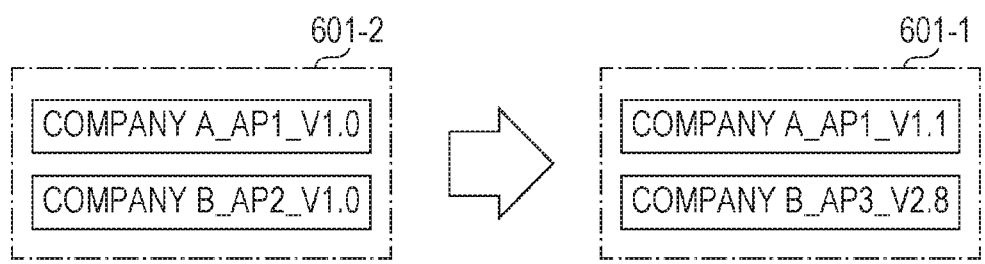
FIG. 17 is a diagram illustrating determination to be made on an application basis.

FIG. 17 illustrates an example of the determination to be made on an application basis. In the determination made on an application basis, if the vendor information of two applications matches and the names of the two applications match, the managing section 632 determines that application information of the two applications matches each other.

If the information provider gives permissions on an application basis, the managing section 632 references the management information and checks the vendor information of the applications within the communication terminals. In FIG. 17, the vendor information of the application AP1 within the communication terminal 601-1 matches the vendor information of the application AP1 within the communication terminal 601-2, and the name of the application AP1 within the communication terminal 601-1 matches the name of the application AP1 within the communication terminal 601-2. Thus, the managing section 632 determines that the application AP1 installed in the communication terminal 601-1 is permitted to use the personal information of the information provider.

On the other hand, although the vendor information of the application AP3 within the communication terminal 601-1 matches the vendor information of the application AP2 within the communication terminal 601-2, the name of the application AP3 within the communication terminal 601-1 does not match the name of the application AP2 within the communication terminal 601-2. Thus, the personal information of the information provider is prohibited from being used by the application AP3 installed in the communication terminal 601-1.

Figure 18:
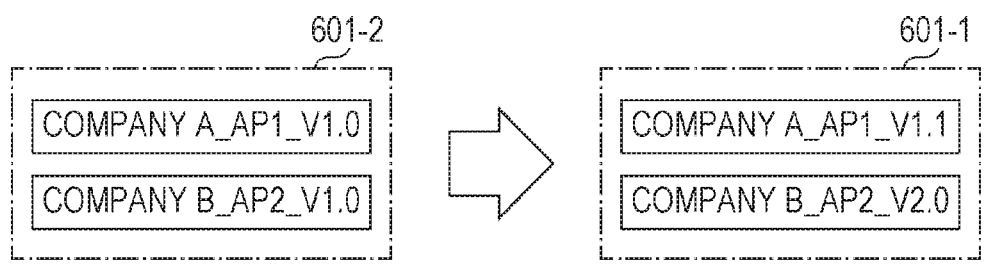
FIG. 18 is a diagram illustrating determination to be made on a version basis.

FIG. 18 illustrates an example of the determination to be made on a version basis. In the determination made on a version basis, if the vendor information of two applications match, the names of the two applications match, and version information satisfies a predetermined relationship, the managing section 632 determines that application information of one of the two applications corresponds to application information of the other of the two applications. The predetermined relationship is that a version indicated by version information of an application that uses personal information is equal to or greater than a version indicated by version information of an application used by an information provider.

In FIG. 18, in the communication terminal 601-2 of the information provider, the application AP1 with the version V1.0 that is provided by the vendor A and the application AP2 with the version V1.0 that is provided by the vendor B are installed. In the communication terminal 601-1, the application AP1 with the version V1.1 that is provided by the vendor A and the application AP2 with the version V2.0 that is provided by the vendor B are installed.

If the information provider gives permissions on a version basis, the managing section 632 references the management information and checks the vendor information of the applications installed in the communication terminals. In FIG. 18, the vendor information of the application AP1 within the communication terminal 601-1 matches the vendor information of the application AP1 within the communication terminal 601-2, the name of the application AP1 within the communication terminal 601-1 matches the name of the application AP1 within the communication terminal 601-2, and the version information satisfies the predetermined relationship. Thus, the managing section 632 determines that the application AP1 installed in the communication terminal 601-1 is permitted to use the personal information of the information provider.

In addition, the vendor information of the application AP2 within the communication terminal 601-1 matches the vendor information of the application AP2 within the communication terminal 601-2, the name of the application AP2 within the communication terminal 601-1 matches the name of the application AP2 within the communication terminal 601-2, and the version information satisfies the predetermined relationship. The managing section 632 determines that the application AP2 installed in the communication terminal 601-1 is permitted to use the personal information of the information provider.

Permission target information indicating that the information provider gives permissions on a vendor basis, an application basis, or a version basis may be included in the application information of the applications. In this case, the managing section 632 makes the determination on a vendor basis, an application basis, or a version basis on the basis of the permission target information included in the application information collected from the communication terminals 601-i.

Figure 19:
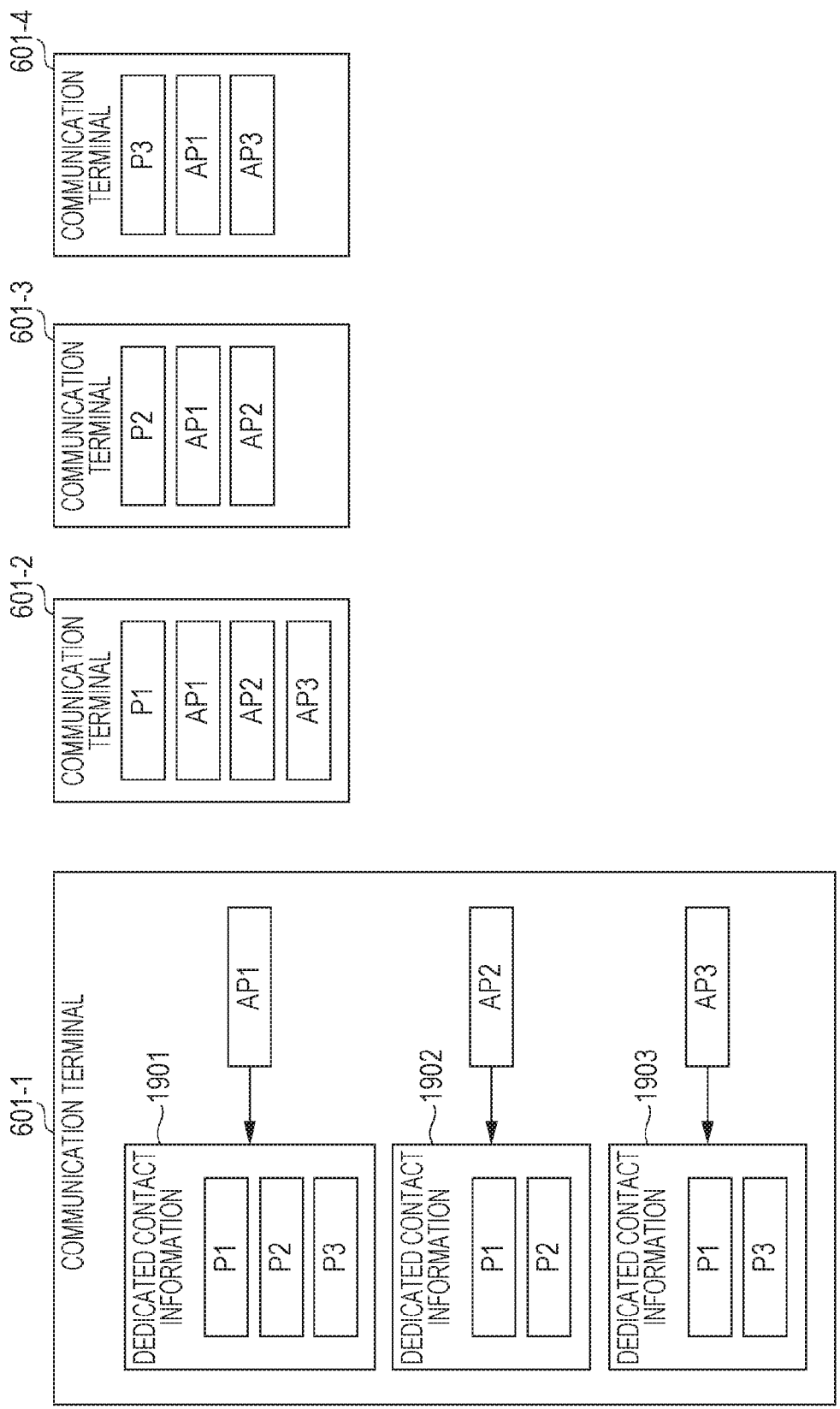
FIG. 19 is a diagram illustrating dedicated contact information for each application.

FIG. 19 illustrates an example of dedicated contact information for each of the applications when the information provider gives permissions on an application basis. In the communication terminals 601-1 and 601-2, the applications AP1, AP2, and AP3 are installed. In the communication terminal 601-3, the applications AP1 and AP2 are installed. In the communication terminal 601-4, the applications AP1 and AP3 are installed.

Personal information P1 includes a contact indicating the communication terminal 601-2, personal information P2 includes a contact indicating the communication terminal 601-3, and personal information P3 includes a contact indicating the communication terminal 601-4.

In this case, the personal information P1, P2, and P3 is registered in dedicated contact information 1901 for the application AP1 within the communication terminal 601-1.

The personal information P1 and P2 is registered in dedicated contact information 1902 for the application AP2. The personal information P1 and P3 is registered in dedicated contact information 1903 for the application AP3.

The application AP1 is permitted to access only the dedicated contact information 1901. The application AP2 is permitted to access only the dedicated contact information 1902. The application AP3 is permitted to access only the dedicated contact information 1903. Thus, the personal information P3 is prohibited from being used by the application AP2 and the personal information P2 is prohibited from being used by the application AP3.

As described above, personal information of information providers that is included in dedicated contact information for applications differs, and only applications that are permitted by an information provider are permitted to access the personal information of the information provider.

Figure 20:
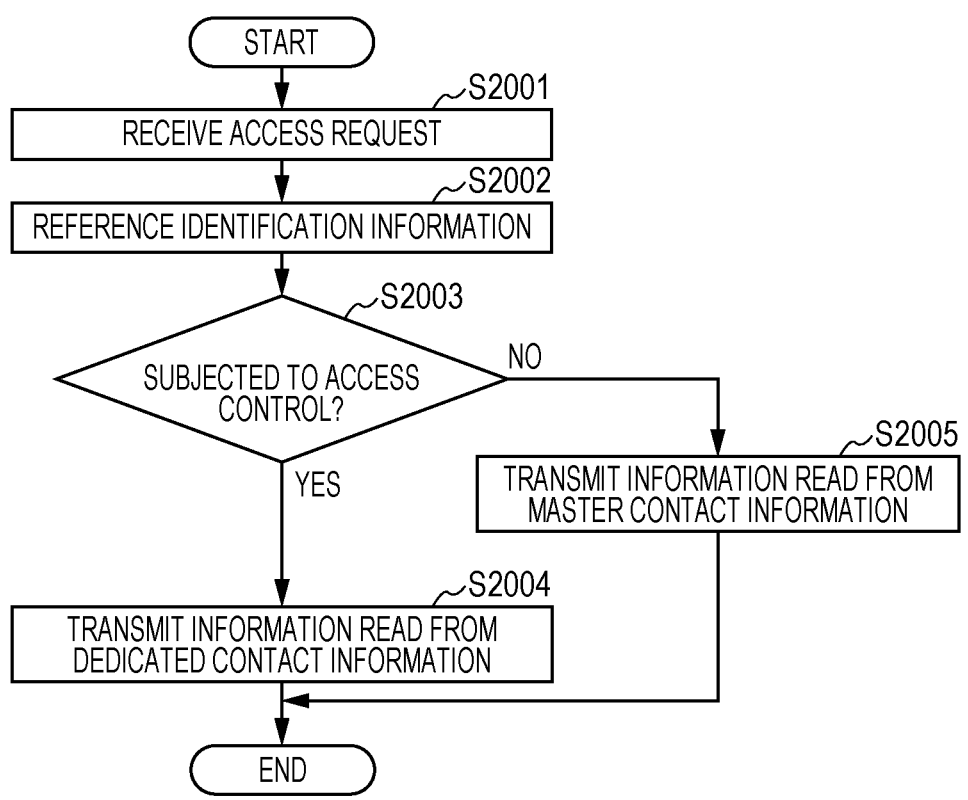
FIG. 20 is a flowchart of an access control process.

FIG. 20 is a flowchart of an example of an access control process to be executed by the controller 612 of the communication terminal 601-i. Upon receiving a request for accessing contact information issued by an application from the executing section 613 (in S2001), the controller 612 references an identification information item, which is included in the access request, of the requesting application that is a source of the request (in S2002). Then, the controller 612 checks, on the basis of the identification information item, whether or not the requesting application is to be subjected to the access control (in S2003).

If the requesting application is to be subjected to the access control (Yes in S2003), the controller 612 reads information from dedicated contact information for the application and transmits the read information to the executing section 613 (in S2004). If the requesting application is not to be subjected to the access control (No in S2003), the controller 612 reads information from the master contact information 621 and transmits the read information to the executing section 613 (in S2005).

Figure 21:
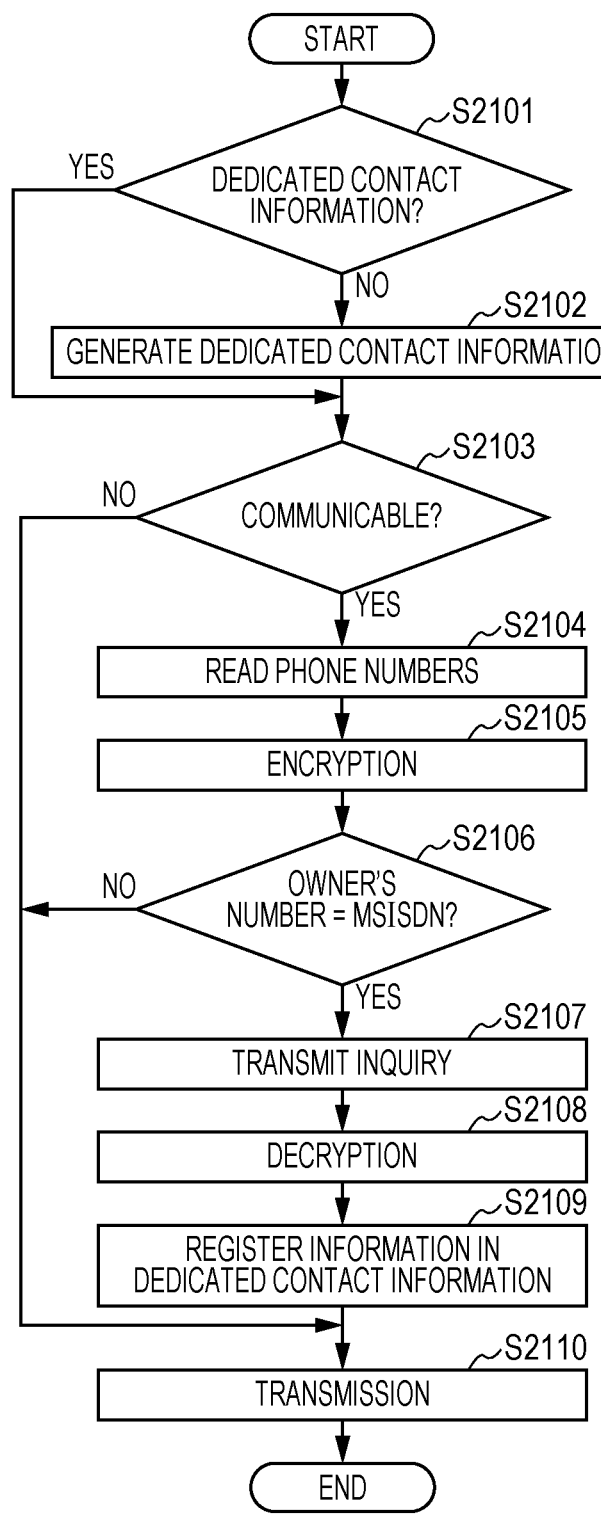
FIG. 21 is a flowchart of a response transmission process.

FIG. 21 is a flowchart of an example of the response transmission process executed in S2004 illustrated in FIG. 20. S2101 to S2109 illustrated in FIG. 21 correspond to the inquiry process described with reference to FIG. 9.

First, the controller 612 checks whether or not the dedicated contact information for the requesting application exists (in S2101). If the dedicated contact information does not exist (No in S2101), the controller 612 generates the dedicated contact information (in S2102). At this time, information is yet to be registered in the generated dedicated contact information.

Then, the controller 612 checks whether or not the communication terminal 601-i is communicable with the managing device 403 (in S2103). If the communication terminal 601-i is communicable with the managing device 403 (Yes in S2103), the controller 612 reads an owner's number and other phone numbers from the master contact information 621 (in S2104). Then, the controller 612 encrypts the read phone numbers and application information of the requesting application so as to generate encrypted data indicating an inquiry (in S2105).

Then, the controller 612 reads a mobile station international subscriber directory number (MSISDN) from a subscriber identity module (SIM) card of the communication terminal 601-i and compares the owner's number with the MSISDN (in S2106). If the owner's number matches the MSISDN (Yes in S2106), the controller 612 transmits the encrypted data to the managing device 403 (in S2107).

Next, the controller 612 receives, from the managing device 403, encrypted data indicating a result of the inquiry and decrypts the encrypted data (in S2108). Then, the controller 612 acquires, from the master contact information 621, information associated with the phone numbers included in the result of the inquiry and registers the acquired information in the dedicated contact information (in S2109). Then, the controller 612 reads the information from the dedicated contact information and transmits the read information to the executing section 613 (in S2110).

If the dedicated contact information exists (Yes in S2101), the controller 612 executes S2103 and later to update the dedicated contact information on the basis of the result of the inquiry in S2109. This update causes a user that newly installed the requesting application to be added to the dedicated contact information and causes a user that is not included in the result of the inquiry to be removed from the dedicated contact information.

If the communication terminal 601-i is not communicable with the managing device 403 (No in S2103), the controller 612 executes S2110. For example, if the communication terminal 601-i is not connected to the communication network 404, the communication terminal 601-i is not communicable with the managing device 403.

If the owner's number does not match the MSISDN (No in S2106), the controller 612 executes S2110. For example, if a phone number that is different from the MSISDN is set as the owner's number in the master contact information 621, the owner's number does not match the MSISDN.

The controller 612 may execute an inquiry process, which is the same as or similar to S2101 to S2109, to generate the dedicated contact information upon the activation of the application.

Figure 22:
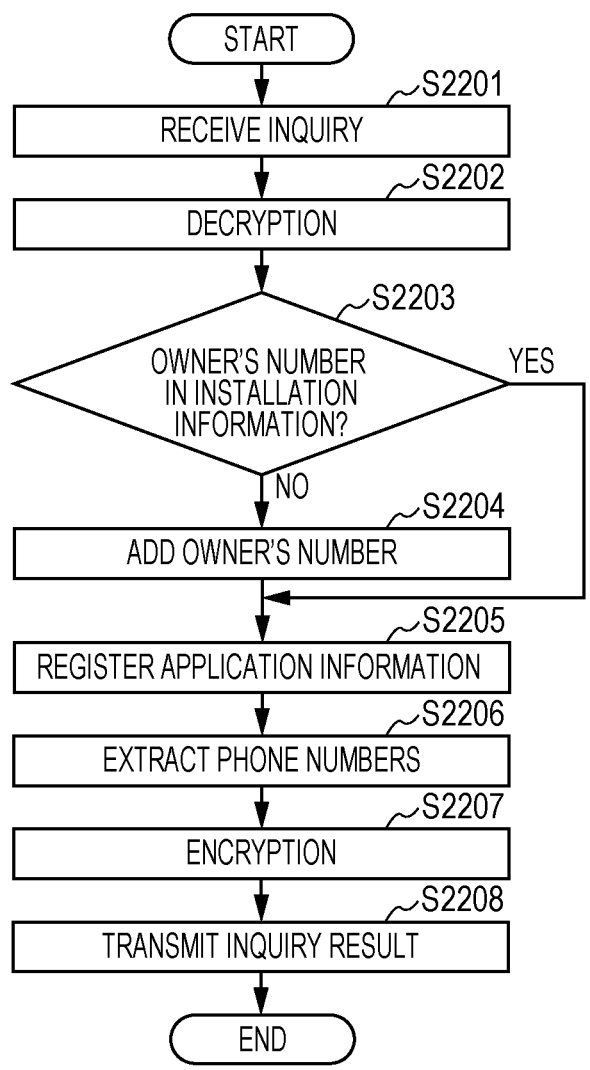
FIG. 22 is a flowchart of a contact extraction process.

FIG. 22 is a flowchart of an example of a contact extraction process to be executed by the managing device 403 that has received the inquiry from the communication terminal 601-i. First, the managing section 632 of the managing device 403 receives the encrypted data from the communication terminal 601-i (in S2201) and decrypts the encrypted data (in S2202).

Next, the managing section 632 checks whether or not the owner's number included in the inquiry exists in the installation information 461 (in S2203). If the owner's number does not exist in the installation information 461 (No in S2203), the managing section 632 adds the owner's number to the installation information 461 (in S2204), and registers the application information in association with the owner's number (in S2205).

Next, the managing section 632 searches the installation information 461 for phone numbers associated with application information corresponding to the application information included in the inquiry and extracts detected phone numbers among the phone numbers included in the inquiry (in S2206). Then, the managing section 632 encrypts the extracted phone numbers so as to generate encrypted data indicating the result of the inquiry (in S2207) and transmits the encrypted data to the communication terminal 601-i (in S2208).

If the owner's number exists in the installation information 461 (Yes in S2203), the managing section 632 executes S2205 and later.

FIG. 23 illustrates an example of installation information 461 in a message digest format. The installation information 461 illustrated in FIG. 23 is obtained by replacing the phone numbers included in the installation information 461 illustrated in FIG. 7 with message digests. For example, "GAxxxx" indicates a message digest of the phone number "71XXXX".

If the managing device 403 stores the installation information 461 in the message digest format, the controller 612 converts the respective phone numbers to the message digests and generates the inquiry in S2105 illustrated in FIG. 21.

FIG. 24 illustrates an example of the encryption process executed in S2105. If encrypted data that indicates the inquiry illustrated in FIG. 10 is to be generated, the controller 612 coverts an owner's number "60000006" to a message digest "AHAABCDE". In addition, the controller 612 converts phone numbers "71XXXX", "72YYYY", "73ZZZZ", and "74AAAA" to message digests "GAxxxx", "GBxxxx", "GCxxxx", and "GDxxxx".

Next, the controller 612 combines the message digests with the application information APA and encrypts the message digests and the application information APA so as to generate encrypted data Enc [APA, AHAABCDE, GAxxxx, GBxxxx, GCxxxx, GDxxxx].

Upon receiving the encrypted data, the managing section 632 decrypts the encrypted data in S2202, acquires the application information APA and the message digests, and executes S2203 and later while treating the message digests as the phone numbers.

In this case, the managing section 632 encrypts a list of the extracted message digests so as to generate encrypted data and transmits the generated encrypted data to the communication terminal 601-*i*. The controller 612 decrypts the encrypted data and acquires the list of the message digests. The controller 612 may compare message digests of the phone numbers included in the master contact information 621 with the received list of the message digests and thereby acquire information associated with the message digests from the master contact information 621.

If an application is uninstalled from a communication terminal 601-*i* of an information provider or if the application is not activated for a long time, it is desirable to assume that the information provider terminated the permission of the use of personal information. In such a case, in order to update the installation information 461 stored in the managing device 403, the controller 612 periodically transmits, to the managing device 403, update information including an application information list of all applications.

The update information may be transmitted when a certain time period elapses after a date of the previous transmission of the update information, and the certain time period may be a time period of one month to one year, for example. The controller 612 transmits, to the managing device 403, update information including an application information list of applications that are being executed at the time of the transmission. The managing section 632 compares the received application information list with an application information list associated with a contact of the communication terminal 601-*i* within the installation information 461 and deletes, from the installation information 461, application information that is not included in the received application information list.

Figure 25:
FIG. 25 is a diagram illustrating update information.

FIG. 25 illustrates an example of update information that is periodically transmitted by the communication terminal 601-2. The update information illustrated in FIG. 25 includes a collection date and an application information list. The managing section 632 receives update information including APA, APB, and APC on Jan. 1, 2015 and receives update information including APA, APC, APD, and APE one month after Jan. 1, 2015. In this case, the managing section 632 determines that the application corresponding to APB has been uninstalled from the communication terminal 601-2, and deletes the application information APB of the communication terminal 601-2 from the installation information 461.

After that, upon receiving an inquiry including the application information APB and a phone number list from the communication terminal 601-1, the managing section 632 transmits, as the result of the inquiry, a phone number list excluding the phone number of the communication terminal 601-2 to the communication terminal 601-1.

After the application 441 is installed in the communication terminal 601-1, an application corresponding to the application 441 may be installed in the communication terminal 601-2 registered in the master contact information 621. In this case, the personal information of the information provider who owns the communication terminal 601-2 is not immediately registered in the dedicated contact information 622 for the application 441. The personal information is registered in the dedicated contact information 622 after the communication terminal 601-2 executes the inquiry process described with reference to FIG. 9 or periodically executes the update process described with reference to FIG. 25 and the managing device 403 updates the installation information 461.

Figure 26:
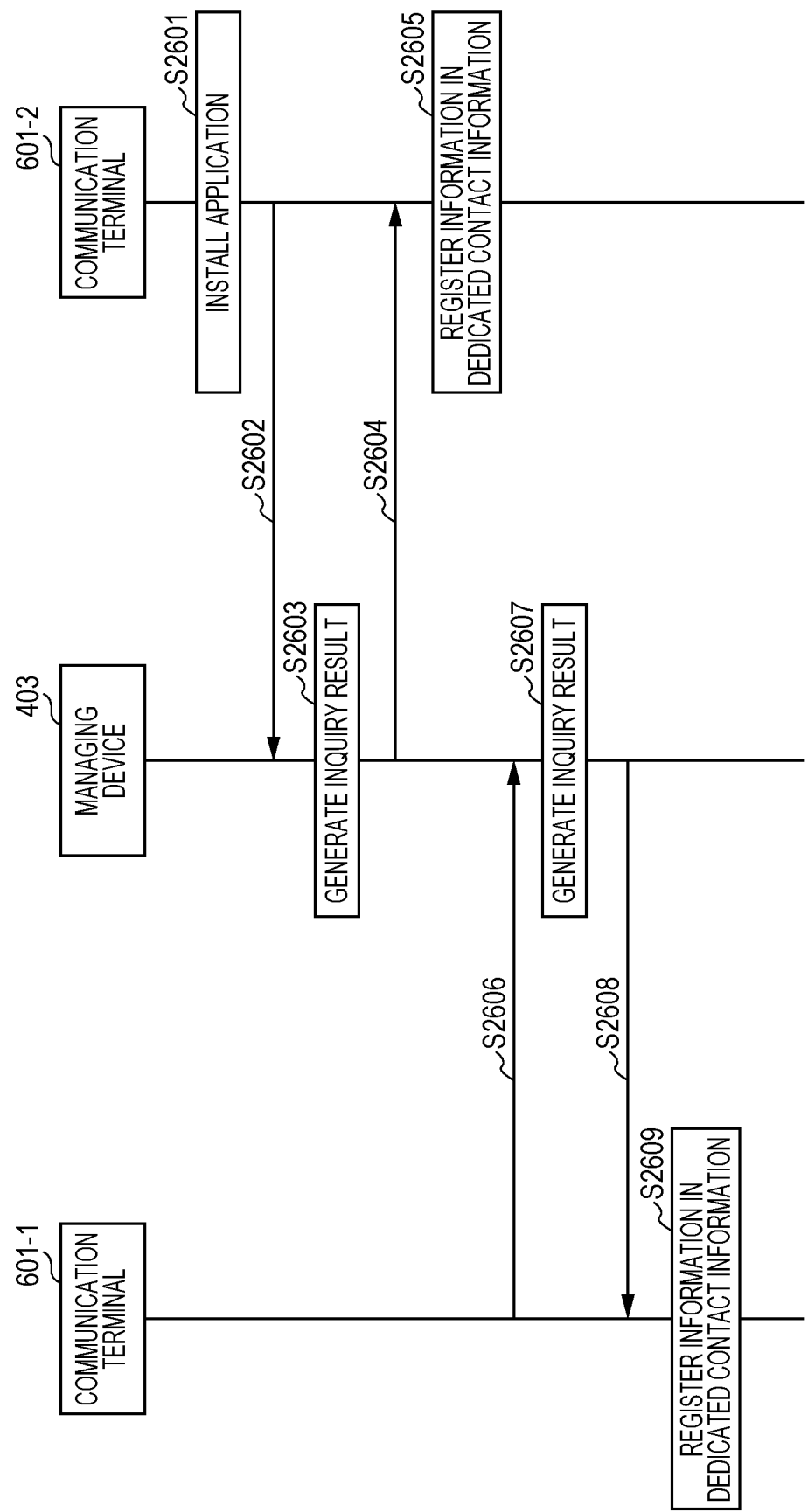
FIG. 26 is a diagram illustrating an inquiry process to be executed in installation.

FIG. 26 illustrates an example of a sequence of the inquiry process that is executed upon the installation of an application. In this example, an owner's number of the communication terminal 601-1 owned by the terminal owner is "60000006" and an owner's number of the communication terminal 601-2 owned by the information provider is "72XXXX". Application information of the application AP1 installed in the communication terminal 601-1 is APA.

Figures 27, 28, 29:
FIG. 27 is a diagram illustrating a second inquiry.
FIG. 28 is a diagram illustrating second installation information.
FIG. 29 is a diagram illustrating a third inquiry.

First, the communication terminal 601-1 transmits an inquiry illustrated in FIG. 27 to the managing device 403 at 20:02 o'clock on Mar. 1, 2015 before the application AP1 is installed in the communication terminal 601-2. In this case, the managing device 403 registers the phone number of the communication terminal 601-1 and the application information APA in the installation information 461, as illustrated in FIG. 28, and transmits, to the communication terminal 601-1, an empty inquiry result that does not include any phone number.

Next, the information provider installs the application AP1 in the communication terminal 601-2 and the application AP1 is activated (in S2601). In this case, the communication terminal 601-2 transmits, to the managing device 403, an inquiry that includes the owner's number of the communication terminal 601-2, the application information, and a phone number list (in S2602).

FIG. 29 illustrates an example of the inquiry transmitted by the communication terminal 601-2. The owner's number is "72XXXX", the application information is APA, and the phone number "60000006" of the communication terminal 601-1 is included in the phone number list.

The managing device 403 generates the result of the inquiry (in S2603), transmits the result of the inquiry to the communication terminal 601-2 (in S2604), and updates the installation information 461.

FIG. 30 illustrates an example of the result of the inquiry illustrated in FIG. 29. The result of the inquiry includes the phone number "60000006" of the communication terminal 601-1.

FIG. 31 illustrates an example of the installation information 461 updated on the basis of the inquiry illustrated in FIG. 29. The application information APA associated with the phone number "72XXXX" of the communication terminal 601-2 is added to the installation information 461 illustrated in FIG. 28.

The communication terminal 601-2 acquires, from the master contact information 621, information associated with the phone number "60000006" included in the result of the inquiry and registers the acquired information in dedicated contact information (in S2605).

Next, the communication terminal 601-1 transmits the inquiry illustrated in FIG. 27 to the managing device 403 (in S2606). The managing device 403 generates the result of the inquiry (in S2607), transmits the generated result of the inquiry to the communication terminal 601-1 (in S2608), and updates the installation information 461.

FIG. 32 illustrates an example of the result of the inquiry illustrated in FIG. 27. The result of the inquiry includes the phone number "72XXXX" of the communication terminal 601-2.

Figures 33, 34:
FIG. 33 is a diagram illustrating fourth installation information.
FIG. 34 is a diagram illustrating a contact deletion process.

FIG. 33 illustrates an example of the installation information 461 updated on the basis of the inquiry illustrated in FIG. 27. The latest collection date associated with the phone number "60000006" included in the installation information 461 illustrated in FIG. 31 is changed to 20:22 o'clock, Mar. 3, 2015.

The communication terminal 601-1 acquires, from the master contact information 621, information associated with the phone number "72XXXX" included in the result of the inquiry and registers the acquired information in dedicated contact information (in S2609).

FIG. 34 illustrates an example of a contact deletion process to be executed by the managing device 403. The latest collection dates are recorded for phone numbers of contacts in the installation information 461. The managing device 403 deletes a phone number if a certain time period elapses after the latest collection date associated with the phone number.

For example, if the certain time period is one month and the current date is Jan. 15, 2015, phone numbers associated with the latest collection dates that are one month or more before Jan. 15, 2015 are deleted among the four phone numbers included in the installation information 461 illustrated in FIG. 34. Thus, "73ZZZZ", "74AAAA" and application information associated with "73ZZZZ" and "74AAAA" are deleted from the installation information 461.

If the managing device 403 receives an inquiry with a phone number list including a deleted phone number, the managing device 403 transmits a result of the inquiry that does not include the phone number. Thus, a contact that indicates a communication terminal 601-$i$ in which the use of an application is stopped may be automatically deleted from dedicated contact information stored in another communication terminal.

Figure 35:
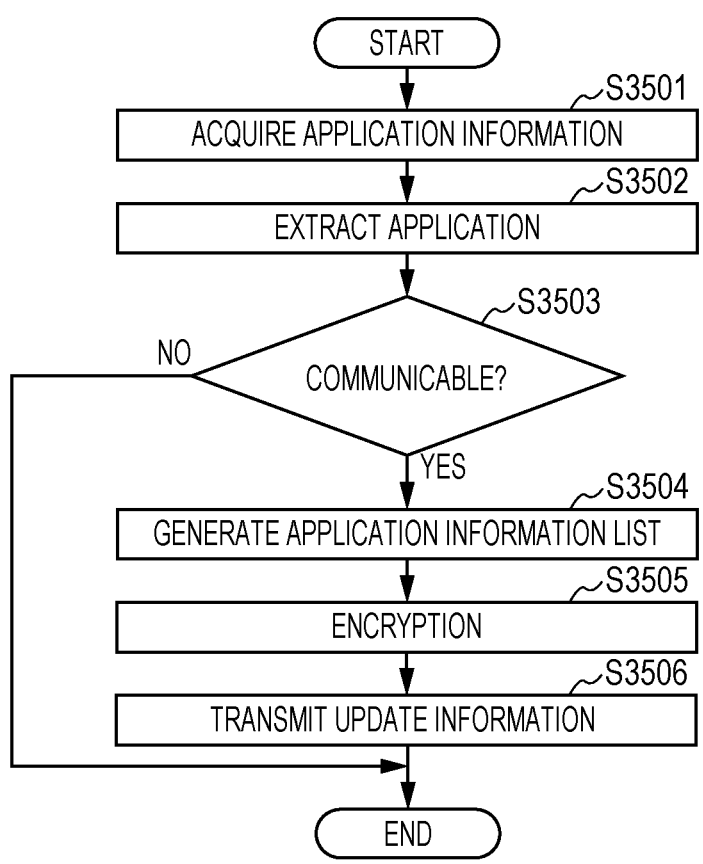
FIG. 35 is a flowchart of an update information transmission process.

FIG. 35 is a flowchart of an example of an update information transmission process to be executed by each of the communication terminals 601-$i$. The update information transmission process illustrated in FIG. 35 is periodically executed at certain time intervals, for example.

When a certain time interval elapses after the previous update information transmission process, the controller 612 of the communication terminal 601-$i$ acquires application information from all applications executed in the communication terminal 601-$i$ (in S3501). Then, the controller 612 extracts, on the basis of the application information, applications that have the right of access to the master contact information 621 or dedicated contact information (in S3502).

Next, the controller 612 checks whether or not the communication terminal 601-$i$ is communicable with the managing device 403 (in S3503). If the communication terminal 601-$i$ is communicable with the managing device 403 (Yes in S3503), the controller 612 generates an application information list of the extracted applications (in S3504). Then, the controller 612 encrypts an owner's number read from the master contact information 621 and the application information list so as to generate encrypted data indicating update information (in S3505) and transmits the encrypted data to the managing device 403 (in S3506).

If the communication terminal 601-$i$ is not communicable with the managing device 403 (No in S3503), the controller 612 terminates the process.

Figure 36:
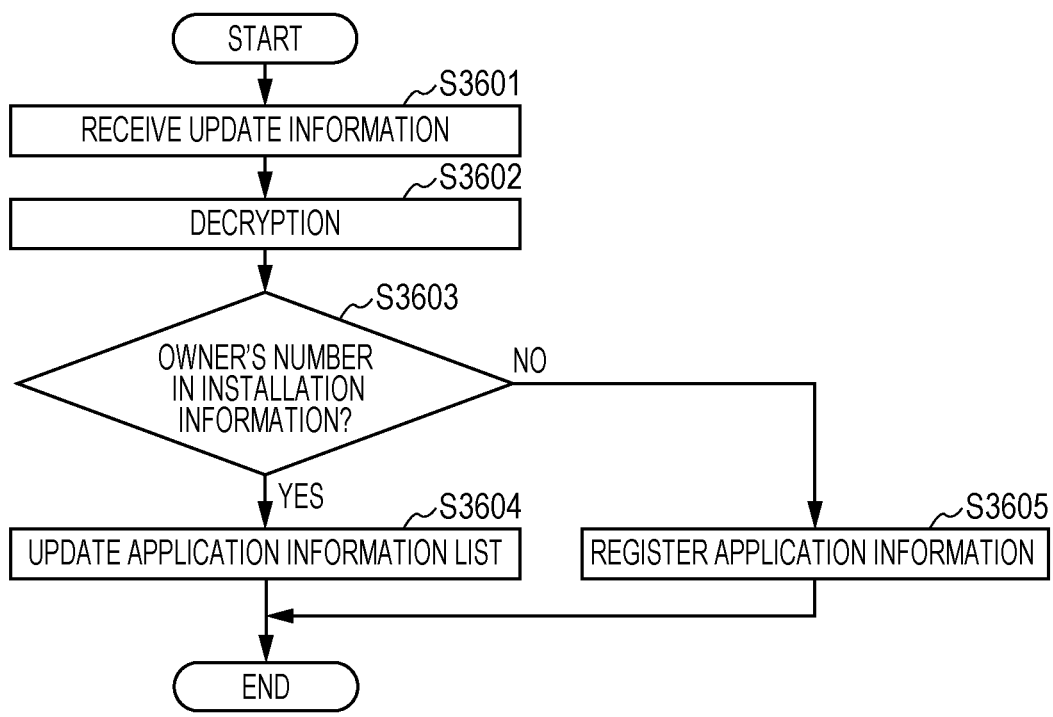
FIG. 36 is a flowchart of an update process.

FIG. 36 is a flowchart of an example of an update process to be executed by the managing device 403 that has received the update information from the communication terminal 601-$i$. First, the managing section 632 of the managing device 403 receives the encrypted data from the communication terminal 601-$i$ (in S3601) and decrypts the encrypted data (in S3602).

Next, the managing section 632 checks whether or not the owner's number included in the update information exists in the installation information 461 (in S3603). If the owner's number exists in the installation information 461 (Yes in S3603), the managing section 632 changes an application information list associated with the owner's number to the application information list included in the update information (in S3604).

This change causes application information, which is not included in the received application information list, to be deleted from the installation information 461. In addition, this change causes application information, which is included in the received application information list and is not included in the installation information 461, to be added to the installation information 461.

If the owner's number does not exist in the installation information 461 (No in S3603), the managing section 632 adds the owner's number to the installation information 461, and registers the application information list in association with the owner's number (in S3605).

By periodically executing the update information transmission process and the update process, the installation information 461 may be maintained at the latest state and a reduction in the quality of the dedicated contact information may be inhibited.

The managing device 403 illustrated in FIG. 6 may be installed in a server of a third party other than the vendor that provides the OS installed in the communication terminals 601-$i$. Alternatively, the managing device 403 illustrated in FIG. 6 may be installed in an application providing server of the vendor that provides the OS. The application providing server of the vendor that provides the OS stores therein the application information of the applications installed in the communication terminals 601-$i$ and the phone numbers of the users who are the terminal owners of the communication terminals 601-$i$. Thus, if the managing device 403 is installed in the application providing server, the communication terminals 601-$i$ may transmit inquiries excluding the owner's numbers and the application information to acquire results of the inquiries.

FIG. 37 illustrates an example of the installation information 461 stored in the managing device 403 in the case where the managing device 403 is installed in the application providing server. The installation information 461 illustrated in FIG. 37 includes user IDs, user information, and application information lists. The user IDs are identification information items given to the users by the application providing server. The user information is personal information such as the phone numbers and the mail addresses. The application information lists are the same as or similar to the application information lists of the installation information 461 illustrated in FIG. 7.

For example, when the communication terminal 601-1 newly downloads the application 441 from the application providing server, the controller 612 transmits, to the managing device 403, an inquiry including the phone number list included in the master contact information 621 stored in the communication terminal 601-1.

FIG. 38 illustrates an example of the inquiry generated from the master contact information 621 illustrated in FIG. 8. In the inquiry illustrated in FIG. 38, the owner's number and the application information that are included in the inquiry illustrated in FIG. 10 are omitted.

The managing section 632 searches the installation information 461 for phone numbers associated with application information corresponding to application information of the downloaded application 441 and extracts the detected phone numbers from the received phone number list. Then, the managing section 632 transmits, to the communication terminal 601-1, the results of the inquiry that include a group of the extracted phone numbers.

If the application information of the application 441 is APA, the result, illustrated in FIG. 11, of the inquiry illustrated in FIG. 38 are transmitted to the communication terminal 601-1. Then, the controller 612 acquires, from the master contact information 621, information associated with the phone numbers included in the result of the inquiry and generates the dedicated contact information 622 illustrated in FIG. 12.

The configurations of the contact management system illustrated in FIGS. 4 and 6 are examples, and a part of the constituent elements may be omitted or changed on the basis of the intended purposes and conditions of the contact management system. For example, the storage section 614 illustrated in FIG. 6 may store therein two or more dedicated contact information items for the number of installed applications.

The flowcharts of FIGS. 5, 20, 21, 22, 35, and 36 are examples, and a part of the processes may be omitted or changed on the basis of the configuration and conditions of the contact management system. For example, if an application that directly accesses the master contact information 621 does not exist, S2003 and S2005 illustrated in FIG. 20 may be omitted.

In the response transmission process illustrated in FIG. 21, the controller 612 may generate the dedicated contact information in S2109 instead of S2102. In this case, S2101 and S2102 may be omitted.

If whether or not the communication terminal 601-*i* is communicable with the managing device 403 is not to be checked, S2103 may be omitted. If whether or not the owner's number matches the MSISDN is not to be checked, S2106 may be omitted.

If the inquiry and the result of the inquiry are not to be encrypted, S2105 and S2108 illustrated in FIG. 21 and S2202 and S2207 illustrated in FIG. 22 may be omitted.

In the update information transmission process illustrated in FIG. 35, if whether or not the communication terminal 601-*i* is communicable with the managing device 403 is not to be checked, S3503 may be omitted. If the update information is not to be encrypted, S3505 illustrated in FIG. 35 and S3602 illustrated in FIG. 36 may be omitted.

The sequences illustrated in FIGS. 9 and 26 are examples, and a part of the processes may be omitted or changed on the basis of the configuration and conditions of the contact management system. For example, in the inquiry process illustrated in FIG. 9, the controller 612 may generate the dedicated contact information in S907 instead of S903. In this case, S903 may be omitted.

The personal information illustrated in FIG. 1, the installation information illustrated in FIGS. 7, 23, 28, 31, 33, and 37, the master contact information illustrated in FIG. 8, and the dedicated contact information illustrated in FIG. 12 are examples, and a part of the information may be omitted or changed on the basis of the configuration and conditions of the contact management system. For example, in the installation information, mail addresses may be used as the contacts instead of the phone numbers. In the master contact information and the dedicated contact information, the readings, the company names, the addresses, and the zip codes may be omitted.

The inquiries illustrated in FIGS. 10, 27, 29, and 38 and the inquiry results illustrated in FIGS. 11, 30, and 32 are examples, and a part of the information may be omitted or changed on the basis of the configuration and conditions of the contact management system. For example, if mail addresses are used as the contacts in the installation information instead of the phone numbers, lists of the mail addresses are used instead of the phone number lists that are included in the inquiries and inquiry results.

The application information illustrated in FIGS. 15 to 18 is examples, and a part of the information may be omitted or changed on the basis of the configuration and conditions of the contact management system. For example, if the determination is not made on a version basis, the version information may be omitted. If the determination is made neither on an application basis nor on a version basis, the application names and the version information may be omitted. If the vendors may be identified from the application names, the vendor information may be omitted.

The update information illustrated in FIG. 25 is an example, and a part of the information may be omitted or changed on the basis of the configuration and conditions of the contact management system. For example, the collection dates may be omitted if the managing device 403 uses, as collection dates, dates when the update information is received.

Figure 39:
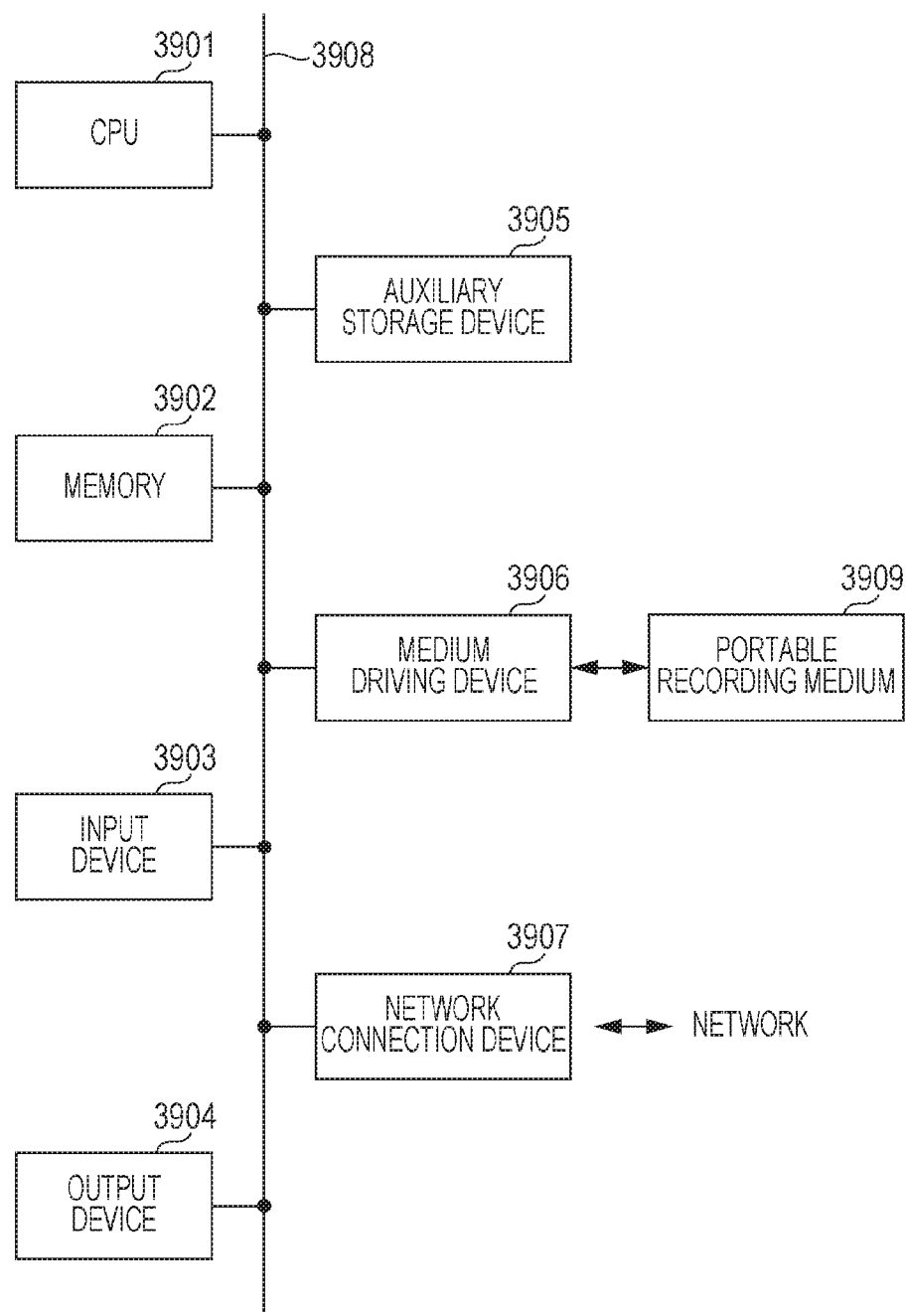
FIG. 39 is a diagram illustrating a configuration of an information processing device.

FIG. 39 illustrates an example of a configuration of an information processing device that achieves the communication terminals 401 and 402-1 to 402-M illustrated in FIG. 4, the communication terminals 601-*i* illustrated in FIG. 6, and the managing device 403 illustrated in FIGS. 4 and 6. The information processing device illustrated in FIG. 39 includes a central processing unit (CPU) 3901, a memory 3902, an input device 3903, and an output device 3904, an auxiliary storage device 3905, a medium driving device 3906, and a network connection device 3907. These constituent elements are connected to each other by a bus 3908.

The memory 3902 is, for example, a semiconductor memory such as a read-only memory (ROM), a random access memory (RAM), or a flash memory and stores therein a program and data that are used for the processes. The memory 3902 may be used as the storage section 411 illustrated in FIG. 4 or the storage section 614 illustrated in FIG. 6.

If the information processing device is a communication terminal 601-*i*, the CPU 3901 (processor) executes the program using the memory 3902 and thereby operates as the communication section 611 and the controller 612 that are illustrated in FIG. 6, for example. The CPU 3901 also operates as the executing section 613.

If the information processing device is the managing device 403, the CPU 3901 executes the program using the memory 3902 and thereby operates as the communication section 631 and the managing section 632 that are illustrated in FIG. 6, for example.

The input device 3903 is, for example, a keyboard, a pointing device, or the like and is used for input of instructions and information from an operator or a user. The output device 3904 is, for example, a display device, a printer, a speaker, or the like and is used for output of inquiries or instructions to the operator or the user and used for output of the results of the processes.

The auxiliary storage device 3905 is, for example, a magnetic disk device, an optical disc device, a magneto-optical disc device, a tape device, or the like. The auxiliary storage device 3905 may be a hard disk drive or a flash memory. The information processing device may store the program and the data in the auxiliary storage device 3905, loads the program and the data into the memory 3902, and use the program and the data. The auxiliary storage device 3905 may be used as the storage section 411 illustrated in FIGS. 4 and 6 or the storage section 614 illustrated in FIG. 6.

The medium driving device 3906 drives a portable recording medium 3909 and accesses details recorded in the portable recording medium 3909. The portable recording medium 3909 is a memory device, a flexible disk, an optical disc, a magneto-optical disc, or the like. The portable recording medium 3909 may be a compact disc read-only memory (CD-ROM), a digital versatile disc (DVD), a universal serial bus (USB) memory, or the like. The operator or the user may store the program and the data in the portable recording medium 3909, load the program and the data into the memory 3902, and use the program and the data.

A computer-readable recording medium that stores therein the program and the data that are used for the processes is a physical (non-transitory) recording medium such as the memory 3902, the auxiliary storage device 3905, or the portable recording medium 3909.

The network connection device 3907 is an interface connected to the communication network 404 and configured to convert data for communication. The information processing device may receive the program and the data from an external device through the network connection device 3907, load the program and the data into the memory 3902, and use the program and the data.

The information processing device may not include all the constituent elements illustrated in FIG. 39, and a part of the constituent elements may be omitted on the basis of the intended purposes and conditions of the information processing device. For example, if any interface is not to be arranged between the information processing device and the operator or the user, the input device 3903 and the output device 3904 may be omitted. If the portable recording medium 3909 is not used, the medium driving device 3906 may be omitted.

If the information processing device is a mobile terminal device such as a smartphone having a calling function, the information processing device may include devices for call, such as a microphone and a speaker and include an imaging device such as a camera.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the computer including a storage device configured to store therein application information related to respective application programs installed in any of communication terminals included in a first terminal group, the process comprising:
   receiving, from a first communication terminal, a first inquiry about first contact information to be provided to a first application program installed in the first communication terminal;
   acquiring first application information related to the first application program;
   acquiring second application information related to second application programs installed in respective second communication terminals included in the first terminal group, the second communication terminals corresponding to respective first contacts stored in the first communication terminal;
   searching the first application information for second contacts associated with the second application information;
   extracting the second contacts from the first contacts; and
   transmitting the second contacts to the first communication terminal.

2. The non-transitory computer-readable recording medium according to claim 1, the process further comprising:
   receiving the first inquiry including the first application information from the first communication terminal when the first communication terminal is requested by the first application program to provide the first contact information; and
   receiving a second inquiry including third application information from the respective second communication terminals when the second communication terminals are requested by the respective second application programs to provide second contact information, the second inquiry being about the second contact information to be provided to the respective second application programs, the third application information being related to the respective second application programs.

3. The non-transitory computer-readable recording medium according to claim 1, wherein
   the storage device stores therein information in which a first identification information item is associated with the first application information, the first identification information item identifying the first communication terminal, and
   the process further comprises:
   acquiring the first application information on basis of the first identification information item upon receiving the first inquiry.

4. The non-transitory computer-readable recording medium according to claim 1, the process further comprising:
   extracting, as one of the second contacts, a third contact from the first contacts, the third contact corresponding to a third communication terminal in which a third application program corresponding to the first application information is installed, the third communication terminal being one of the second communication terminals.

5. The non-transitory computer-readable recording medium according to claim 4, wherein
the first application information includes first vendor information indicating a vendor of the first application program,
the second application information includes second vendor information indicating a vendor of the third application program, and
the process further comprises:
extracting the third contact from the first contacts if the first vendor information corresponds to the second vendor information.

6. The non-transitory computer-readable recording medium according to claim 4, the process further comprising:
deleting third application information from the storage device upon receiving update information from the third communication terminal, the third application information being related to the third application program, the update information indicating that the third application program has been uninstalled from the third communication terminal; and
transmitting fourth contacts to the first communication terminal upon receiving the first inquiry after the third application information is deleted, the fourth contacts excluding the third contact.

7. A contact management system, comprising:
a first communication terminal configured to
store therein first contacts, and
have a first application program installed therein; and
a managing device including:
a storage device configured to
store therein application information related to respective application programs installed in any of communication terminals included in a first terminal group, and
a first processor configured to
receive, from the first communication terminal, a first inquiry about first contact information to be provided to the first application program,
acquire first application information related to the first application program,
acquire second application information related to second application programs installed in respective second communication terminals included in the first terminal group, the second communication terminals corresponding to the respective first contacts,
search the first application information for second contacts associated with the second application information,
extract the second contacts from the first contacts, and
transmit the second contacts to the first communication terminal.

8. The contact management system according to claim 7, wherein
the first processor is configured to
receive the first inquiry including the first application information from the first communication terminal when the first communication terminal is requested by the first application program to provide the first contact information, and
receive a second inquiry including third application information from the respective second communication terminals when the second communication terminals are requested by the respective second application programs to provide second contact information, the second inquiry being about the second contact information to be provided to the respective second application programs, the third application information being related to the respective second application programs.

9. The contact management system according to claim 7, wherein
the storage device stores therein information in which a first identification information item is associated with the first application information, the first identification information item identifying the first communication terminal, and
the first processor is configured to
acquire the first application information on basis of the first identification information item upon receiving the first inquiry.

10. The contact management system according to claim 7, wherein
the first processor is configured to
extract, as one of the second contacts, a third contact from the first contacts, the third contact corresponding to a third communication terminal in which a third application program corresponding to the first application information is installed, the third communication terminal being one of the second communication terminals.

11. The contact management system according to claim 10, wherein
the first application information includes first vendor information indicating a vendor of the first application program,
the second application information includes second vendor information indicating a vendor of the third application program, and
the first processor is configured to
extract the third contact from the first contacts if the first vendor information corresponds to the second vendor information.

12. The contact management system according to claim 10, wherein
the first processor is configured to
delete third application information from the storage device upon receiving update information from the third communication terminal, the third application information being related to the third application program, the update information indicating that the third application program has been uninstalled from the third communication terminal, and
transmit fourth contacts to the first communication terminal upon receiving the first inquiry after the third application information is deleted, the fourth contacts excluding the third contact.

13. The contact management system according to claim 7, wherein
the first communication terminal includes:
a second processor configured to
prohibit an access from the first application program to the first contact information including the first contacts,
permit an access from the first application program to second contact information including the second contacts, and permit an access from a third application program installed in the first communication terminal to the first contact information.

14. A contact management method, comprising:
receiving by a computer, from a first communication terminal, a first inquiry about first contact information to be provided to a first application program installed in the first communication terminal;
acquiring first application information related to the first application program;
acquiring second application information related to second application programs installed in respective second communication terminals included in a first terminal group, the second application information being stored in a storage device configured to store therein application information related to respective application programs installed in any of communication terminals included in the first terminal group, the second communication terminals corresponding to respective first contacts stored in the first communication terminal;
searching the first application information for second contacts associated with the second application information;
extracting the second contacts from the first contacts; and
transmitting the second contacts to the first communication terminal.

15. The contact management method according to claim 14, further comprising:
receiving the first inquiry including the first application information from the first communication terminal when the first communication terminal is requested by the first application program to provide the first contact information; and
receiving a second inquiry including third application information from the respective second communication terminals when the second communication terminals are requested by the respective second application programs to provide second contact information, the second inquiry being about the second contact information to be provided to the respective second application programs, the third application information being related to the respective second application programs.

16. The contact management method according to claim 14, wherein
the storage device stores therein information in which a first identification information item is associated with the first application information, the first identification information item identifying the first communication terminal, and
the method further comprises:
acquiring the first application information on basis of the first identification information item upon receiving the first inquiry.

17. The contact management method according to claim 14, further comprising:
extracting, as one of the second contacts, a third contact from the first contacts, the third contact corresponding to a third communication terminal in which a third application program corresponding to the first application information is installed, the third communication terminal being one of the second communication terminals.

18. The contact management method according to claim 17, wherein
the first application information includes first vendor information indicating a vendor of the first application program,
the second application information includes second vendor information indicating a vendor of the third application program, and
the method further comprises:
extracting the third contact from the first contacts if the first vendor information corresponds to the second vendor information.

19. The contact management method according to claim 17, further comprising:
deleting third application information from the storage device upon receiving update information from the third communication terminal, the third application information being related to the third application program, the update information indicating that the third application program has been uninstalled from the third communication terminal; and
transmitting fourth contacts to the first communication terminal upon receiving the first inquiry after the third application information is deleted, the fourth contacts excluding the third contact.

* * * * *